(12) United States Patent
Chunilal

(10) Patent No.: US 8,666,993 B2
(45) Date of Patent: Mar. 4, 2014

(54) SYSTEM AND METHOD FOR SOCIAL NETWORKING FOR MANAGING MULTIDIMENSIONAL LIFE STREAM RELATED ACTIVE NOTE(S) AND ASSOCIATED MULTIDIMENSIONAL ACTIVE RESOURCES AND ACTIONS

(75) Inventor: Rathod Yogesh Chunilal, Maharashtra (IN)

(73) Assignee: Onepatont Software Limited, Mumbai, Maharashtra (IN)

( * ) Notice: Subject to any disclaimer, the term of this patent is extended or adjusted under 35 U.S.C. 154(b) by 0 days.

(21) Appl. No.: 13/001,785

(22) PCT Filed: Mar. 3, 2010

(86) PCT No.: PCT/IN2010/000122
§ 371 (c)(1),
(2), (4) Date: Dec. 28, 2010

(87) PCT Pub. No.: WO2011/101858
PCT Pub. Date: Aug. 25, 2011

(65) Prior Publication Data
US 2012/0316962 A1    Dec. 13, 2012

(30) Foreign Application Priority Data
Feb. 22, 2010 (IN) .......................... 467/MUM/2010

(51) Int. Cl.
*G06F 17/30* (2006.01)
(52) U.S. Cl.
CPC ............................... *G06F 17/30861* (2013.01)
USPC ........ 707/749; 707/707; 707/713; 705/14.54; 709/204
(58) Field of Classification Search
CPC ................................................ G06F 17/30861

USPC ................ 707/640, 661, 707, 713, 749, 827; 705/14.54; 709/204
See application file for complete search history.

(56) References Cited

U.S. PATENT DOCUMENTS

| 5,493,692 A | 2/1996 | Theimer et al. |
| 5,983,227 A | 11/1999 | Nazem et al. |

(Continued)

FOREIGN PATENT DOCUMENTS

| WO | WO 01/37232 A1 | 5/2001 |
| WO | WO 2006/059343 A2 | 6/2006 |

(Continued)

OTHER PUBLICATIONS

Order Granting/Denying Request for Ex Parte Reexamination for U.S. Appl. No. 90/012,282 (Jul. 9, 2012).

(Continued)

*Primary Examiner* — Shahid Alam
(74) *Attorney, Agent, or Firm* — Potter Anderson and Corroon, LLP; Rakesh H. Mehta, Esq.

(57) ABSTRACT

The present invention relates device, system and method for facilitating receiving active note(s) from active note(s) provider(s) from the client device and responding multidimensional active resources & actions(s) for said active note(s) by multidimensional active resources & actions(s) provider(s) to the client device. A real time and/or near real communication mechanism such as online, smart and mobile communication applications like web site, smart client, instant messaging, e-mail may be used to communicate with a client device and a community of responders or multidimensional active resources & actions(s) provider(s). One or more Active Note(s) are received from client devices, processed, and sent to responders. Responses from the responders are received, and response is sent to the client device.

51 Claims, 9 Drawing Sheets

(56) References Cited

U.S. PATENT DOCUMENTS

| | | |
|---|---|---|
| 5,987,440 A | 11/1999 | O'Neil et al. |
| 6,009,432 A | 12/1999 | Tarin |
| 6,115,709 A | 9/2000 | Gilmour et al. |
| 6,199,063 B1 | 3/2001 | Colby et al. |
| 6,269,369 B1 | 7/2001 | Robertson |
| 6,311,186 B1 | 10/2001 | MeLampy et al. |
| 6,480,885 B1 * | 11/2002 | Olivier ............ 709/207 |
| 6,606,644 B1 | 8/2003 | Ford et al. |
| 6,691,155 B2 | 2/2004 | Gottfried |
| 6,745,178 B1 | 6/2004 | Emens et al. |
| 6,810,401 B1 | 10/2004 | Thompson et al. |
| 6,871,231 B2 | 3/2005 | Morris |
| 6,871,322 B2 | 3/2005 | Gusler et al. |
| 6,895,412 B1 | 5/2005 | Hutchinson |
| 6,901,394 B2 | 5/2005 | Chauhan et al. |
| 6,938,068 B1 | 8/2005 | Kraft et al. |
| 7,010,518 B1 | 3/2006 | Bedell et al. |
| 7,047,202 B2 | 5/2006 | Jaipuria et al. |
| 7,120,628 B1 | 10/2006 | Conmy et al. |
| 7,162,494 B2 | 1/2007 | Arellano |
| 7,246,164 B2 | 7/2007 | Lehmann et al. |
| 7,249,034 B2 | 7/2007 | Schirmer et al. |
| 7,266,764 B1 | 9/2007 | Flam |
| 7,269,590 B2 | 9/2007 | Hull et al. |
| 7,299,240 B1 | 11/2007 | Crozier |
| 7,325,012 B2 | 1/2008 | Nagy |
| 7,353,199 B1 | 4/2008 | DiStefano |
| 7,454,509 B2 | 11/2008 | Boulter et al. |
| 7,539,697 B1 * | 5/2009 | Akella et al. ............ 707/669 |
| 7,599,935 B2 | 10/2009 | La Rotonda et al. |
| 7,669,123 B2 | 2/2010 | Zuckerberg et al. |
| 7,747,648 B1 | 6/2010 | Kraft et al. |
| 7,788,260 B2 | 8/2010 | Lunt et al. |
| 7,801,953 B1 * | 9/2010 | Denman et al. ............ 709/204 |
| 7,827,208 B2 | 11/2010 | Bosworth et al. |
| 7,844,604 B2 | 11/2010 | Baio et al. |
| 7,899,915 B2 | 3/2011 | Reisman |
| 7,921,369 B2 | 4/2011 | Bill |
| 7,991,764 B2 | 8/2011 | Rathod |
| 8,073,839 B2 | 12/2011 | Rathod |
| 8,103,691 B2 | 1/2012 | Chunilal |
| 2002/0120462 A1 | 8/2002 | Good |
| 2002/0143961 A1 | 10/2002 | Siegel et al. |
| 2002/0188689 A1 | 12/2002 | Michael |
| 2004/0193691 A1 | 9/2004 | Chang |
| 2004/0215793 A1 | 10/2004 | Ryan et al. |
| 2005/0021750 A1 | 1/2005 | Abrams |
| 2005/0044008 A1 | 2/2005 | Freishtat et al. |
| 2005/0086230 A1 * | 4/2005 | Frees et al. ............ 707/770 |
| 2005/0086290 A1 | 4/2005 | Joyce et al. |
| 2005/0131894 A1 | 6/2005 | Vuong |
| 2005/0149395 A1 | 7/2005 | Henkin et al. |
| 2005/0149397 A1 | 7/2005 | Morgenstern et al. |
| 2005/0149494 A1 * | 7/2005 | Lindh et al. ............ 707/704 |
| 2005/0154639 A1 | 7/2005 | Zetmeir |
| 2005/0165656 A1 | 7/2005 | Frederick et al. |
| 2005/0171955 A1 | 8/2005 | Hull et al. |
| 2005/0256756 A1 | 11/2005 | Lam et al. |
| 2005/0278443 A1 | 12/2005 | Winner |
| 2005/0283474 A1 | 12/2005 | Francis et al. |
| 2006/0004680 A1 | 1/2006 | Robarts et al. |
| 2006/0026147 A1 * | 2/2006 | Cone et al. ............ 707/704 |
| 2006/0064346 A1 | 3/2006 | Steenstra et al. |
| 2006/0117378 A1 | 6/2006 | Tam et al. |
| 2006/0200435 A1 | 9/2006 | Flinn et al. |
| 2006/0271997 A1 | 11/2006 | Jacoby et al. |
| 2007/0150537 A1 | 6/2007 | Graham |
| 2007/0174244 A1 | 7/2007 | Jones |
| 2007/0174258 A1 | 7/2007 | Jones et al. |
| 2007/0174273 A1 | 7/2007 | Jones et al. |
| 2007/0179792 A1 | 8/2007 | Kramer |
| 2007/0185843 A1 | 8/2007 | Jones et al. |
| 2007/0260520 A1 | 11/2007 | Jha et al. |
| 2007/0266003 A1 | 11/2007 | Wong et al. |
| 2008/0016218 A1 | 1/2008 | Jones et al. |
| 2008/0021755 A1 | 1/2008 | Jones et al. |
| 2008/0021884 A1 | 1/2008 | Jones et al. |
| 2008/0021885 A1 | 1/2008 | Jones |
| 2008/0033791 A1 | 2/2008 | Jones et al. |
| 2008/0033917 A1 | 2/2008 | Jones et al. |
| 2008/0033959 A1 | 2/2008 | Jones |
| 2008/0033970 A1 | 2/2008 | Jones et al. |
| 2008/0040474 A1 | 2/2008 | Zuckerberg et al. |
| 2008/0051064 A1 | 2/2008 | Jones et al. |
| 2008/0104225 A1 | 5/2008 | Zhang et al. |
| 2008/0104679 A1 | 5/2008 | Craig |
| 2008/0134294 A1 | 6/2008 | Mattox et al. |
| 2008/0134298 A1 | 6/2008 | Nathan et al. |
| 2008/0140665 A1 | 6/2008 | Ariel et al. |
| 2008/0162260 A1 | 7/2008 | Rohan et al. |
| 2008/0228537 A1 | 9/2008 | Monfried |
| 2008/0270389 A1 | 10/2008 | Jones et al. |
| 2008/0275899 A1 | 11/2008 | Baluja et al. |
| 2008/0281622 A1 | 11/2008 | Hoal |
| 2008/0294624 A1 | 11/2008 | Kanigsberg et al. |
| 2009/0006206 A1 | 1/2009 | Groe et al. |
| 2009/0006333 A1 | 1/2009 | Jones et al. |
| 2009/0010004 A1 | 1/2009 | Godo |
| 2009/0018903 A1 | 1/2009 | Iyer |
| 2009/0037257 A1 | 2/2009 | Stuckey et al. |
| 2009/0070219 A1 | 3/2009 | D'Angelo et al. |
| 2009/0083134 A1 | 3/2009 | Burckart et al. |
| 2009/0100032 A1 | 4/2009 | Jones et al. |
| 2009/0112701 A1 | 4/2009 | Turpin et al. |
| 2009/0119167 A1 | 5/2009 | Kendall et al. |
| 2009/0119263 A1 | 5/2009 | Jones et al. |
| 2009/0119264 A1 | 5/2009 | Bostic et al. |
| 2009/0125521 A1 | 5/2009 | Petty |
| 2009/0132500 A1 | 5/2009 | Jones et al. |
| 2009/0157523 A1 | 6/2009 | Jones et al. |
| 2009/0182589 A1 | 7/2009 | Kendall et al. |
| 2009/0228464 A1 | 9/2009 | Jones et al. |
| 2010/0010822 A1 | 1/2010 | Bal et al. |
| 2010/0146054 A1 | 6/2010 | Armstrong et al. |
| 2010/0146443 A1 | 6/2010 | Zuckerberg et al. |
| 2010/0318571 A1 | 12/2010 | Pearlman et al. |
| 2011/0004692 A1 | 1/2011 | Occhino et al. |
| 2011/0004831 A1 | 1/2011 | Steinberg et al. |
| 2011/0004922 A1 | 1/2011 | Bono et al. |
| 2011/0029612 A1 | 2/2011 | Bosworth et al. |
| 2011/0078018 A1 | 3/2011 | Chunilal |
| 2011/0078128 A1 | 3/2011 | Chunilal |
| 2011/0078129 A1 | 3/2011 | Chunilal |
| 2011/0078583 A1 | 3/2011 | Chunilal |
| 2011/0082881 A1 | 4/2011 | Chunilal |
| 2011/0125906 A1 | 5/2011 | Chunilal |
| 2011/0153413 A1 | 6/2011 | Chunilal |
| 2011/0153759 A1 | 6/2011 | Rathod |
| 2011/0154220 A1 | 6/2011 | Chunilal |
| 2011/0161314 A1 | 6/2011 | Chunilal |
| 2011/0161319 A1 | 6/2011 | Chunilal |
| 2011/0161419 A1 | 6/2011 | Chunilal |
| 2011/0162038 A1 | 6/2011 | Chunilal |
| 2011/0191417 A1 | 8/2011 | Rathod |
| 2011/0208822 A1 | 8/2011 | Rathod |
| 2011/0225293 A1 | 9/2011 | Rathod |
| 2011/0231363 A1 | 9/2011 | Rathod |
| 2011/0231489 A1 | 9/2011 | Rathod |
| 2011/0276396 A1 | 11/2011 | Rathod |
| 2012/0011238 A1 | 1/2012 | Rathod |
| 2012/0016858 A1 | 1/2012 | Rathod |
| 2012/0102172 A1 | 4/2012 | Rathod |
| 2012/0158517 A1 | 6/2012 | Rathod |

FOREIGN PATENT DOCUMENTS

| | | |
|---|---|---|
| WO | WO 2007/052285 A2 | 5/2007 |
| WO | WO 2008/134279 A1 | 11/2008 |
| WO | WO 2010/001406 A1 | 1/2010 |

OTHER PUBLICATIONS

Non-Final Official Action for U.S. Appl. No. 13/015,238 (May 24, 2012).

(56) References Cited

OTHER PUBLICATIONS

Non-Final Official Action for U.S. Appl. No. 12/847,840 (May 23, 2012).
Non-Final Official Action for U.S. Appl. No. 13/015,224 (Mar. 28, 2012).
Complaint for Patent Infringement in the United States District Court for the Northern District of California San Jose Division for Case No. CV12-01212 (Mar. 12, 2012).
Amendment B and Response under 37 C.F.R. § 1.116 for U.S. Appl. No. 12/496,606 (Mar. 2, 2012).
Amendment A for U.S. Appl. No. 12/485,856 (Feb. 29, 2012).
Final Official Action for U.S. Appl. No. 12/496,555 (Feb. 16, 2012).
Applicant-Initiated Interview Summary for U.S. Appl. No. 12/485,856 (Feb. 16, 2012).
Notice of Intent to Issue Ex Parte Reexamination Certificate for U.S. Appl. No. 90/011,892 (Jan. 24, 2012).
Final Official Action for U.S. Appl. No. 12/193,702 (Jan. 23, 2012).
Non-Final Offcial Action for U.S. Appl. No. 12/973,351 (Jan. 5, 2012).
Response to Office Action dated Oct. 18, 2011 for U.S. Appl. No. 12/496,555 (Dec. 28, 2011).
Amendment C for U.S. Appl. No. 12/193,702 (Dec. 17, 2011).
Restriction and/or Election Requirement for U.S. Appl. No. 13/015,224 (Nov. 28, 2011).
Restriction and/or Election Requirement for U.S. Appl. No. 12/847,840 (Nov. 9, 2011).
Office Action in Ex Parte Reexamination for U.S. Appl. No. 90/011,892 (Nov. 2, 2011).
Order Granting / Denying Request for Ex Parte Reexamination for U.S. Appl. No. 90/011,892 (Nov. 2, 2011).
Applicant-Initiated Interview Summary for U.S. Appl. No. 12/193,702 (Oct. 20, 2011).
Applicant-Initiated Interview Summary for U.S. Appl. No. 12/195,321 (Oct. 19, 2011).
Non-Final Official Action for U.S. Appl. No. 12/496,555 (Oct. 18, 2011).
Notification of Prior Art Citation under 37 C.F.R. § 1.501 for U.S. Appl. No. 11/502,757 (Sep. 30, 2011).
Non-Final Official Action for U.S. Appl. No. 12/485,856 (Sep. 29, 2011).
Commonly-assigned, co-pending U.S. Appl. No. 13/243,433 for "A System and Method of Peer to Peer Service Based Social Network, Data Relaying and Information Management," (Unpublished, filed Sep. 23, 2011).
Non-Final Official Action for U.S. Appl. No. 12/195,321 (Sep. 22, 2011).
Non-Final Official Action for U.S. Appl. No. 11/493,291 (Sep. 15, 2011).
Notification of Prior Art Citation under 37 C.F.R. § 1.501 for U.S. Appl. No. 11/503,242 (Sep. 9, 2011).
Request for Ex Parte Reexamination under 37 C.F.R. § 1.510 for U.S. Patent No. 7,991,764 (Sep. 6, 2011).
Non-Final Official Action for U.S. Appl. No. 12/496,606 (Sep. 6, 2011).
Submission of Prior Art Under 37 C.F.R. § 1.501 in regards to U.S. Appl. No. 12/496,606 (Jul. 29, 2011).
Non-Final Official Action for U.S. Appl. No. 12/193,702 (Jul. 25, 2011).
Notice of Allowance and Fee(s) Due for U.S. Appl. No. 12/853,108 (Jun. 23, 2011).
Notice of Allowance and Fee(s) Due for U.S. Appl. No. 12/948,495 (Jun. 22, 2011).
Belkin et al., "Linked: Network Updates Uncovered," http://qconsf.com/dl/qcon-sanfran-2009/slides/RuslanBelkin_and_SeanDawson_LinkedInNetworkUpdatesUncovered.pdf, pp. 1-42 (Downloaded from the Internet May 11, 2011).
O'Neill, "The Complete Guide to Twitter," http://manuals.makeuseof.com.s3.amazonaws.com/twitter-guide.pdf, pp. 1-53 (Downloaded from the Internet May 11, 2011).

Screenshot of Meme from Yahoo, http://meme.yahoo.com/home/, p. 1 (Downloaded from the Internet May 11, 2011).
Screenshot of Twitter About Screen, http://twitter.com/about, p. 1 (Downloaded from the Internet May 11, 2011).
"Twitter," http://en.wikipedia.org/wiki/Twitter, pp. 1-23 (Downloaded from the Internet May 11, 2011).
"What's with Web Activities," http://windowslive.ninemsn.com.au/livesuite/article/792840/whats-with-web-activities, pp. 1-21 (Downloaded from the Internet May 11, 2011).
"Windows Live team blog archive," http://windowslivearchive.wordpress.com/2008/12/22/sharing-what-you-do-outside-of-windows-live-web-activities/, pp. 1-5 (Downloaded from the Internet May 11, 2011).
Indian Patent Application No. 1174/MUM/2011 for "A System and Method for O-Mail or Omnipresent Communication, O-Mail Address, O-Mail Service, O-Mail Client, O-Mail Server, Network, Platform and Pin Point Communication Protocol (PPP)," (Unpublished, Filed Apr. 8, 2011).
Notice of Allowance and Fee(s) Due for U.S. Appl. No. 11/995,343 (Mar. 30, 2011).
PCT International Application No. PCT/IB2011/051319 for "A Method and System for Customized, Contextual, Dynamic and Unified Communication, Zero Click Advertisement, Dynamic E-Commerce and Prospective Customers Search Engine," (Unpublished. Filed Mar. 29, 2011).
PCT International Application No. PCT/IB2011/051318 for "A Method and System for Dynamically Publishing, Sharing, Communication and Subscribing," (Unpublished, Filed Mar. 29, 2011).
Restriction and/or Election Requirement for U.S. Appl. No. 12/853,108 (Mar. 25, 2011).
Indian Patent Application No. 868/MUM/2011 for "A System and Method for Managing, Monitoring, Tracking, Updating, Measuring and Facilitate in Maintaining User Status and State," (Unpublished, Filed Mar. 24, 2011).
Notification of Prior Art Citation under 37 C.F.R. § 1.501 for U.S. Appl. No. 11/503,242 (Feb. 28, 2011).
Interview Summary for U.S. Appl. No. 11/995,343 (Feb. 25, 2011).
Screenshot of Experts Exchange Main Screen, http://www.experts-exchange.com/aboutUs.jsp, p. 1 (Downloaded from the Internet Feb. 23, 2011).
Submission of Prior Art Under 37 C.F.R. § 1.501 in regards to U.S. Appl. No. 12/496,555 (Jan. 14, 2011).
International Preliminary Report on Patentability and Written Opinion of the International Searching Authority for International Application No. PCT/IN2008/000425 (Jan. 5, 2011).
"Flickr: Recent Activity," http://www.flickr.com/photos/caseorganic/4816582827/, p. 1 (Copyright 2011).
"Network Updates," LinkedIn, http://www.linkedin.com/mbox?displayNetworkUpdates, p. 1 (Copyright 2011).
"Post Network Update," LinkedIn, http://developer.linkedin.com/docs/DOC-1009, pp. 1-2 (Copyright 2011).
"The Recent Activity Box," YouTube, http://www.google.com/support/youtube/bin/answer.py?hl=en&answer=118693, pp. 1-2 (Copyright 2011).
"Windows Live: Services," http://profile.live.com/webactivities, pp. 1-2 (Copyright 2011).
Submission of Prior Art Under 37 C.F.R. § 1.501 in regards to U.S. Appl. No. 12/485,856 (Dec. 31, 2010).
Communication pursuant to Article 94(3) EPC for European Application No. 06 842 707.9 (Dec. 7, 2010).
Non-Final Official Action for U.S. Appl. No. 11/995,343 (Nov. 16, 2010).
Hearing Submissions for Indian Patent Application No. 878/MUM/2005 (Sep. 27, 2010).
Submission of Prior Art Under 37 C.F.R. § 1.501 in regards to U.S. Appl. No. 12/193,702 (Aug. 30, 2010).
Notification of Transmittal of the International Search Report and Written Opinion of the International Searching Authority, or the Declaration for International Application No. PCT/US2010/038024 (Aug. 5, 2010).
Amendment B for U.S. Appl. No. 11/493,291 (Jun. 11, 2010).
Submission of Prior Art Under 37 C.F.R. § 1.501 in regards to U.S. Appl. No. 12/195,321 (Jun. 10, 2010).

(56) References Cited

OTHER PUBLICATIONS

Interview Summary for U.S. Appl. No. 11/493,291 (Jun. 2, 2010).
Hearing Submissions for Indian Patent Application No. 878/MUM/2005 (Apr. 9, 2010).
PCT International Application No. PCT/IN2010/000122 for "A System and Method for Social Networking for Managing Multidimensional Life Stream Related Active Note(s) and Associated Multidimensional Active Resources and Actions," (Unpublished, Filed Mar. 3, 2010).
Indian Patent Application No. 467/MUM/2010 for "A System and Method for Social Networking for Managing Multidimensional Life Stream Related Active Note(s) and Associated Multidimensional Active Resources and Actions" (Unpublished, Filed Feb. 22, 2010).
Hearing Letter for Indian Patent Application No. 878/MUM/2005 (Feb. 1, 2010).
"Google Buzz: See updates in real time," http://www.google.com/buzz, p. 1 (Copyright 2010).
Reply to First Examination Report for Indian Patent Application No. 878/MUM/2005 (Dec. 15, 2009).
International Search Report for International Application No. PCT/IN2008/000425 (Jul. 6, 2009).
First Examination Report for Indian Patent Application No. 878/MUM/2005 (Feb. 17, 2009).
International Search Report and Written Opinion of the International Searching Authority for International Application No. PCT/US08/80789 (Dec. 12, 2008).
International Preliminary Report on Patentability and Written Opinion of the International Searching Authority for International Application No. PCT/IN2006/000260 (Jan. 22, 2008).
"Notice from the European Patent Office dated Oct. 1, 2007 concerning business methods," Official Journal EPO, pp. 592-593 (Nov. 2007).
Ahern et al., "Over-Exposed? Privacy Patterns and Considerations in Online and Mobile Photo Sharing," CHI 2007, pp. 1-10 (Apr. 28-May 3, 2007).
Indian Patent Application No. 878/MUM/2005 for "A System for Universal Information and Knowledge Transmission, Reception, Searching and Management Using Human Capabilities Powered by Universal Computing Grid for Enhanced Social Networking and Instituting Knowledge Dissemination Infrastructure," (Jul. 6).
"NetAlter Service Browser: An Interface that connects to a truly service oriented architecture based framework; enabling on-demand web services and rich/thin/smart client applications over the NetAlter network, harnessing the power of its GRID," NetAlter Service Browser White Paper, NetAlter Software Limited, pp. 1-32 (May 2006).
"Peer-to-Peer Personal Network Implementation in NetAlter: Peer-to-peer computing gets a new meaning as it forms the core structure of the NetAlter framework in bringing about new innovations," NetAlter Peer2Peer White Paper, NetAlter Software Limited, pp. 1-21 (May 2006).
Hull et al., "Enabling Context-Aware and Privacy-Conscious User Data Sharing," Proceedings of the 2004 IEEE International Conference on Mobile Data Management (MDM'04), pp. 1-12 (2004).
"MySpace Developer Team News and Announcements," http://developer.myspace.com/Community/blogs/devteam/archive/2008/04/02/friend-updates.aspx, pp. 1-3 (Copyright 2003-2009).
Riche et al., "Client-Side Profile Storage: A Means to put the User in Control," Hewlett-Packard Company, pp. 1-26 (Nov. 14, 2001).
Dorrell, "Miski: A White Paper," pp. 1-3 (Jun. 3, 2000).
Malone et al., "Intelligent Information-Sharing Systems," Communications of the ACM, vol. 30, No. 5, pp. 390-402 (May 1987).

* cited by examiner

Figure 7

SYSTEM AND METHOD FOR SOCIAL NETWORKING FOR MANAGING MULTIDIMENSIONAL LIFE STREAM RELATED ACTIVE NOTE(S) AND ASSOCIATED MULTIDIMENSIONAL ACTIVE RESOURCES AND ACTIONS

PRIORITY CLAIM

This application is a national stage application under 35 U.S.C. §371 of PCT application number PCT/IN2010/000122, filed Mar. 3, 2010, which claims the benefit of Indian patent application no. 467/MUM/2010 filed Feb. 22, 2010, the disclosures of each of which are incorporated herein by reference in their entireties.

COPYRIGHTS INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file, but otherwise reserves all copyright rights whatsoever. The applicant acknowledges the respective rights of various Intellectual property owners.

FIELD OF INVENTION

The present invention relates generally to submitting active note(s) to system and system selects and/or matches relevant multidimensional active resources & actions providers(s) and route said active note(s) to said matched or selected or subscribed multidimensional active resources & actions provider(s) and facilitating said multidimensional active resources & actions providers(s) for creating multi dimensional environment based on user's profiles, updated information and historical notes or life stream related resources for interpreting user's active note(s) and based on that identifying one or more concept(s) associated with said active note(s) and providing multiple suggested resources & action(s) on each concept(s) for each said active note(s) including one or more actions, suggestions, solution, queries & answers, direction, guidance, execution plan, step by step procedures, to do, tips & tricks, more particularly, but not exclusively to using a community to provides personalized or customized multi model or multidimensional active resources & actions for active note(s). User can select or use or like or execute or follow said one or more multidimensional active resources & actions for said active note(s) and provide comments and/or assign rank(s) to said multidimensional active resources & actions and submit to the central server for making them searchable for other similar users.

BACKGROUND OF THE INVENTION

The internet provides a number of mechanisms that allow a user to find solution for particular problems. Search engines allow a user to search for web pages by using keywords or other criteria. A search engine typically uses algorithms to retrieve and order relevant results, such as web pages or other documents. Typically, a user of a search engine reads one or more of the document results, in order to determine the solution to a particular problem.

Many types of Social networks and communication systems are facilitating users for sharing, searching, communicating and solving some problems.

Answering system in which a user may submit a question. One or more people from an answering community may submit an answer to the question. Answers can be submitted over a period of hours or days. The user can return to the site hours or days after submitting a question to view the submitted answers.

All above method required lot of efforts and user have to use proper search keyword(s) or query or question and search method and sources for finding solution. But all users are not known or able to provide all dimensions or environment or context or concept(s) related with said active note(s) and metadata or search keyword(s). But present invention creates multidimensional environment around said active note(s) or statement and multiple domain or subject specific multidimensional active resources & actions providers(s) analyze said user's active note(s) or statement(s) and provides multi dimensional analysis from multiple angles or viewpoints including creating multiple concepts and provides each relevant concept specific resources like actions, experience, how to do, when & where to go for what, questions & answers, directions, solutions, suggestions, knowledge, information, tips & tricks, procedures, helps, executing actions. Therefore, it is with respect to these considerations and others that the present invention has been made.

OBJECT OF THE INVENTION

The principal object of the present invention is to recording each user's or any types of entity's life stream as per taxonomy classification or categories with metadata including all useful information & knowledge, experience, domain specific profiles, comments, reviews, messages, blogs, articles, book marks, problems and related solutions, day to day notes related to health (all types of personal health reports, medicines used, information & experience related to hospitals, doctors, dispensaries, medical store etc.), education (school, college, class, courses, results, awards or achievements etc.), travel (experience, locations, flights, tours, hotels, motels, restaurants, foods, visiting tourist places, problem faced and solution, best things), entertainment, jobs (about all employers, job experience, co-workers or professionals, clients experience, each problems and solutions), business (start to current related to experience, execution, clients, workers or staffs related, growth, each problems and related one or more solutions), events, parties, participations, sports (sports likes, clubs, events, participation, achievements), hobbies, story, connected people like friends, family, social, class mates, co-workers or professionals, neighbors' public & shared life stream, social networks connection, products and services used (brands prefer, why, experience, best things, features, comments, reviews, price, comparison, new or useful products & services, availability etc.), shopping, money spending, news, life style, complaints, images, videos, photos, albums, presentation, flow charts, files, resources, solution or execution plan for day to day small things or problems and all active resources useful for similar or like minded users or similar activities specific users for saving users wastes of time, money, energy and resources for providing right direction in each step of life.

Another significant objective of the present invention is to provides in real or near real time relevant and useful Multi-dimensional Active Resources & Actions by Provider(s) to Active Note(s) Provider(s) or users including actions, what to do, better way to do, more ways, questions & related answers, answers, suggestions, solution, guidance, help, finance, supplies, information, knowledge, tips & tricks, training, learning, match making, ideas, what, where, when, why and how like information.

Yet another important objective of the present invention is to provide user's complete current environment to providers for understanding user, user's behavior, user's active note(s) or statement(s) for providing multidimensional viewpoints & active resources from plurality of providers including actions, guidance, supports, direction, helps in execution, practical information, suggestion, solution, suggested more ways, tips & tricks, complete experience for particular problem or queries or task or work or job or procedure or plan or project or business or any types of knowledge or information or resources related to before doing anything which are related to user or user's connected people or environment and thus saving user's time, money and energy.

Yet another important objective of the present invention is to provide personal and customized encyclopedia of user's each active note(s) with active resources & actions which are useful or current or live or important or active to user.

Yet another important objective of the present invention is to provide all possible concept specific ranked multidimensional active resources & actions to user(s) for each active note(s) form multiple matched sources of multidimensional active resources & actions providers comprising result-oriented actions, positive steps, active resources designed to actively promote and advance the status, any measures taken to rectify conditions, acts or deeds used to remedy a situation, remove an error, or adjust a condition, carry out a task, execute the things, planned series of actions, tasks or steps designed to achieve an objective or goal, guide the implementation or improvements of any types of process including task assignments, milestones, timelines, resource allocations, data collection methodology, and evaluation, step or series of steps to be taken, detailed description of the steps used to implement a strategic plan, a plan to determine what information is missing or pending, where and when to collect this information, and who will need the information e.g. series of instructions given by your doctor to follow based on symptoms.

Yet another important objective of the present invention is to store or update or index or create or develop all types and categories of all possible activities and related all types of actions & experience specific ontology for all types of people, companies, manufacturing, processing, education, qualification, learning, locations, languages, countries (world), religions, societies, casts, jobs, works, businesses, services, fields, career, courses, professionals, branded products and services, procedures, knowledge domains, activities, purposes, age group, income group, qualification group, hobby, interest and like.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following teems take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "client application" refers to an application that runs on a client computing device. A client application may be written in one or more of a variety of languages, such as 'C', 'C++', 'C#', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Briefly stated, the present invention is directed towards providing users with quick multidimensional active resources, view points, actions and resources provided by multidimensional active resources & actions provider(s) to active note(s) provided or publish by active note(s) provider(s). Mechanisms of the invention may enable a community of responders to receive an active note(s) and submit responses or multidimensional active resources & actions. A server may receive and aggregate the responses, and send an aggregated response or multidimensional active resources & actions to the user or active note provider.

Moreover, the present invention makes use of the following terms, definitions, acronyms, and abbreviations for describing the invention or Connected Life or Multidimensional Active resources & Actions or Central Server, System, Network, Platform and Framework:

Active Note(s) OR Active Statement(s): is interpreted in multidimensional ways or modes by plurality of relevant active resources & actions providers for judging user and user's note or statement or related acts or works or tasks or procedures or goals or issues or topic or meaning or needs or problems or queries or requirements or importance or behaviors and based on that multidimensional active resources & actions providers creates or builds or invent or construct or generate multiple concepts, queries, angles and provides multiple types of viewpoints, knowledge or information or resources or directions or actions or advise or guidance or suggestions or tips & tricks or answers or solutions to users or active note(s) provider(s). Recording or storing important Active Note or Active Statement and related ranked or selected or implemented active resources & actions and details notes on executed or implemented or successfully used or acquired said resources for said active notes will create user's useful active life stream. Active Notes OR Active Statements covers every small to big important things or points or notes or events or incidence of user's (including any entity) life and providers are directed the said user for said active note(s) in each step of user's life and that active and successfully used or implements resources are useful for other similar or like minded user or user's of similar active note(s) and again that resources filtered for other similar types of users up to (N) depths or times. So complete right directions or actions for all activities are created and updated for all types of users' active note(s). User can submits any types of notes that matters to user or user's life covering what user want to do next or what user currently doing or what user in near future or in future want to do and updates active note(s) for life stream related to what currently do (progressive note), what did successfully or what was important for life stream including any types of activities or acts or actions or event or proceedings or dealings or procedures or achievements or do something, before doing or want to do, current status, before spent money, before using any brands (products & services) or things, important decisions, career, selection, match making, location updates, do something, take steps, take action, undertaking, function, perform, start something or commence and like.

Active Sub Note OR Active Sub Statement(s): is based on and relates to parent or main active note(s) and can up to (N) numbers of depths e.g. Main Active Note (1) then Sub Active Note (1.1) then Sub-Sub Active Note (1.2 to 1.N)

Active Note OR Active Statement Provider(s): Various entities may perform actions, or assume particular roles. While typically, an entity may assume a single role, the invention is not so constrained, and an entity may also assume a plurality of roles or personae. Thus, within the present invention, a "User" is an active note(s) provider or "User" is "Friends" of or "Connected" to other user or "User" is enterprise active note(s) provider's administrator or "User is "Experts" or "User" is developer of the applications and services or "User" is advertiser or content partner and like. The terms "administrator" or "admin" refer to those entities whose primary role includes managing the active note(s) and/or providing multidimensional active resources and actions, establishing the editorial workflows and/or creating accounts, and managing the life stream. The terms "end-user," and "user" refer to those entities that may register for use of the Connected Life or Multidimensional Active Resources & Actions or Central Server or Platform or System or Network or Framework or any feature(s) or service(s) or application(s) or device(s), and typically provide "user generated contents". While an entity typically represents a person, the invention is not so limited and including one or more individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises or an entity that exists as a particular and discrete unit. Thus, an entity may include virtually any person, group of persons, businesses, organizations, or even a computing structure including a program, or the like. Intended user or groups of individual or volunteer or experts or service providers or any entity like company or organization can register as multidimensional active resources & actions with one or more service profile(s) to the central server. Service profile may comprise one or more expertise area of provider(s), service details, service type, keywords, taxonomies, ontology, rank, points, levels, payment details, availability timings and like. Central server make said service profile(s) searchable for users or active note(s) provider(s) for subscribing or selecting or matching said one or more provider(s) for active note(s) specific multidimensional active resources & actions.

Multidimensional Active Resources & Actions: is resources provided by one or more Multidimensional Active Resources & Actions Providers based on active note(s) submit or sent or publish or advertise or broadcast or updates by active note(s) provider(s) and said active note(s) provider(s)' public or shared or selected life stream resources. Multidimensional Active Resources & Actions comprising any types of resources contributed or shared or provided by one or more Multidimensional Active Resources & Actions Providers individually or collaboratively including multiple angles of viewpoints, information, knowledge, help like finance or money or physical resources, resources related to any types of active notes including actions, activities, acts, work, task, job, order, promotion, loan or financing, e-commerce, shopping, supplies, development, production, contract, business process, knowledge process, information process, procedure, assignment, solution for problem, need, requirement, goal, target, enquiry, tracking, follow-up, presentation, sales, marketing, advertising by providing support, help, answer, feedback, reference, experience, guess, logic, consulting & advising, survey, research, analysis, data mining & processing, review, comments, ranking, guidance, opinions, decision making, comparing, planning, suggestions, tips, tricks, education, learning, training, tutoring, testing, collection, organizing, projection, referring, agent or mediation, support services, discussion, content authoring & management and like.

Multidimensional Active Resources & Actions Provider(s): is provider of Multidimensional Active Resources & Actions includes any individual or person or administrator or any entity. While an entity typically represents a person, the invention is not so limited and including one or more individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises or an entity that exists as a particular and discrete unit. Thus, an entity may include virtually any person, group of persons, businesses, organizations, or even a computing structure including a program, or the like.

Central Server or Multidimensional Active Resources & Actions Server or Connected Life Server: facilitating active note(s) provider(s) and Multidimensional Active Resources & Actions Provider(s). The main role of the central server is receiving, validating, processing, updating, storing, formatting, indexing one or more or plurality of active note(s) from plurality of active note(s) providers and route said active note(s) to selected or matched or subscribed Multidimensional Active Resources & Actions Provider(s) and receiving, validating, processing, updating, storing, indexing one or more or plurality of Multidimensional Active Resources & Actions from plurality of Multidimensional Active Resources & Actions Provider(s) and route said Multidimensional Active Resources & Actions to related active note(s) provider(s) and make all said public active note(s) and related Multidimensional Active Resources & Actions with rank and comments searchable for other users for similar active note(s) related active resources & actions.

Life Stream: is all categories active note(s) and associated one or more ranked Multidimensional Active Resources & Actions which are used or executed or best matched or preferred or selected or implemented or tried or liked or selected and satisfied to the user or selected & successfully implemented by user or choose, buy or purchase or subscribed by user including any branded or un-branded products and services, solve the user's problem(s), provides right direction or help to the user for any types of important action(s), activities, act(s), deed(s), behavior, steps, before doing, buying, subscribing, selecting, experimenting something, before going, traveling, migrating somewhere, how to do something, purpose, event, pursuit, search, match making, tracking, alerts, matter, affair, question, puzzle, doings, hobby, difficulty, trouble, struggle, decision, subject, topic, thing, problem, issue, interest, procedure(s), task(s), job(s), pastime, work(s), service(s), professional(s), occupation, business, manufacturing, processing, diversion change, alteration, transformation, shift, migration, career, goal, plan, project, target, consulting, situation, duty, mission, responsibility, function, construction, deal, transaction, arrangement, matter, operation, contract, undertaking, enterprise, scheme, development, exercises, assignment, obligation, industry, selling, marketing, production, company, film, organization, establishment, news, travels, health, education, finance and like. Life stream covers all chronological user generated or created or provided or updated active note(s) with metadata including taxonomy categories, date & time, rank, review notes or comments and like.

Subscribe Life Stream (Following of Life Stream): User or active note(s) provider(s) can follow one or more categories of one or more life stream of one or more other like minded or matched users or connected people or active notes providers.

Subscriptions of My Life Stream (Followers of Life Stream): Other like minded or matched users or active notes providers can subscribe or follow user's one or more categories of one or more life stream with permissions. Multidimensional Active Resources & Actions Provider(s) can also follow one or more categories of one or more life stream of one or more matched users or active notes providers for providing one or more Multidimensional Active Resources & Actions for one or more active note(s) in which Multidimensional Active Resources & Actions Providers are experts or have experience in that subject or field or domain or topics or active note(s).

Life Stream List(s): is categories list of other users life stream related to particular taxonomy wise category of age groups, income range groups, professional(s), activities, actions, act(s), hobby, interest, education, qualification, work, school, college, work, task, destination, location, language, occupation, similar preferences, problems or like minded users and like. Categories Life Stream List(s) can be private or public or shared and facilitates user's to subscribe plurality of other users' life stream.

Domain Specific User's or Active Note OR Active Statement Provider's Profiles: is provided, created, submitted and updated by active note(s) provider(s) or user to the central server. Central server receives, stores, updates, validates, process and indexes all said one or more user's one or more domain or field or subject specific profile(s) and make said public profile(s) searchable for other users and Multidimensional Active Resources & Actions Provider(s). Mainly profile(s) are used for match making and understanding active note(s) or active note(s) provider(s).

Domain Specific Active Resources & Actions Provider's Profiles: is provided, created, submitted and updated by Multidimensional Active Resources & Actions Provider(s) to the central server. Central server receives, stores, updates, validates, process and indexes all said one or more Multidimensional Active Resources & Actions Provider's one or more domain or field or subject specific profile(s) and make said public profile(s) searchable for users for matching Multidimensional Active Resources & Actions Provider(s) for Multidimensional Active Resources & Actions and Multidimensional Active Resources & Actions Provider(s) for collaboration.

Applications & Services attachments with Active Resources & Actions: Multidimensional Active Resources & Actions Provider(s) can attach one or more matched or related application(s) and/or service(s) with one or more active note(s) of one or more active note(s) provider(s). E.g. active note "Travel to Goa" attached with travel related full features application(s) and service(s) like e-commerce of travel related products and services (e.g. ticket booking, books and like), travel related social network(s) and like.

Reviews or Comments on Active Note(s): User can note down each note(s) and related resource including text, messages, publications, links, video, audio, voice, photos, images, connections and make some important note(s) as active note(s) and sent to connected or subscribed or matched Multidimensional Active Resources & Actions Provider(s) for Multidimensional Active Resources & Actions which provides plurality of and multiple types of viewpoints, resources and directions. User can use or implement or experiment selected or all of the Multidimensional Active Resources & Actions and after using or implementing or experimenting said one or more Multidimensional Active Resources & Actions for said related one or more active note(s), user can assign rank and give comments or reviews to said one or more successful Multidimensional Active Resources & Actions and manually or automatically sent or submit to the central server for storing, validating, processing, updating and indexing said active note(s) and related all ranked Multidimensional Active Resources & Actions. Central server makes them searchable for other similar or like minded or similar active note(s) related users or active notes providers. So other users can get more relevant and filtered Multidimensional Active Resources & Actions from the central server's search engine. Again same procedures take place up to (N) numbers of depths and times and said filtered resources become more relevant and successful for other later users.

A typical present invention works in a following manner which is presented as example only and does not limit the scope of its working: e.g. User "Yogesh Rathod" sent or submit an Active Note: "I will visit New York City" with metadata includes date & time, one or more taxonomies, categories, details and associate user's full or partial or selected resources or links as per user's public, private and shared settings including one or more profile(s), past active note(s) and associated active resources & action(s) & related reviews, comments, ranks, status, execution details, updated information by user and like to one or more selected or subscribed or matched active resource(s) & actions provider(s). So one or more active resources & actions provider(s) can search filtered or uses all or selected said user's resources for understanding user and said active note(s) specific concepts or multi dimensional environment and can provides or suggests one or more relevant concepts specific one or more active resources & action(s) which may useful to users. So said note(s) provider(s) can get multi dimensional relevant analysis, view points or personalized or customized note(s)

specific active & updated dynamic encyclopedia from plurality of sources like visa procedures, different experiences from different users for visiting New York City, suggested new products or gift items shopping addresses and features or details, best restaurant & hotels, tourist places, best season to visit, new types of activities in New York City like sports, entertainment, festival, fair, parties, programs, events, providing news related to New York City, weather conditions, about local people, business scope, job opportunities, to do at air port like shopping, food, facilities, experience, in-flight experience, clearance procedures or experience, transport related information, experience, suggestion, directions, products and services related information from brands or providers e.g. hotel or cruise booking, discounted hotels, visit advertisers hotel, buy clothes from particular mall, expert information related to particular sub-note(s) e.g. after some time user submit new sub or child note(s) related to parent note(s) like "I am pure vegetarian" and user may get suggested active resources & action(s) or multidimensional analysis like address & directions of pure vegetarian restaurants in New York city, taste and cost of foods, experience of restaurants and like for achieving goal i.e. "I am pure vegetarian and currently in New York City, so it is hard to find hotel, I am new so I do not know about food taste, food price, restaurant location and like. So said information are useful for said note(s) provider user. User use said knowledge for executing the said statements i.e. "I am pure vegetarian" and after visiting said restaurant user can provide or write comments on said note(s), assign ranks to said active resource & actions and/or active resources & actions provider(s). Central server or system receives, stores, updates, process, validates and indexes all said resources related to main and sub note(s) and make them searchable for other users or active resources providers for similar active note(s).

Another example is user "Yogesh Rathod" submits or updates or sent an Active Note: "My plan is to start software business in Mumbai" with metadata includes date & time, one or more taxonomies, categories, details and user's resources including one or more profile(s), past active note(s) and associated active multidimensional resources & action(s) and related comments, reviews, ranks, execution details, updated information by user and like to one or more selected or subscribed or matched active resource(s) & actions provider(s). So one or more active resources & actions provider(s) can search, select or filtered all said user's resources for understanding user specific multi dimensional environment and can provides or suggest one or more relevant active multidimensional resources & action(s), thus creating encyclopedia related to said main and sub note(s). So said note(s) provider can get multi dimensional relevant analysis, view points or personalized or customized note(s) specific encyclopedia from plurality of sources like manpower, salary scale of particular positions, finance, marketing, location, realty, office space, furniture, computer hardware and software for development, company procedure, NASCOM membership benefits, other employers experience and guidance, patent importance, field or domain specific resources, IT related news, products and service providers resources, further details or clarification or communication for suggesting products and services, updated information for each active resources by active resources providers.

Custom commands & search syntax: User can use one or more or group(s) or combinations or series or sequence of custom commands & syntax or command templates or scripts with search operators and parameters for searching, matching, two way matching, selecting, filtering, subscribing, mapping, downloading, accessing, invoking, programming, book marking, attaching, detaching, assigning, federating, aggregating, integrating, distributing, collaborating & communicating, composing, comparing, co-coordinating, orchestrating, choreographing, organizing, recording, configuring or customizing, classifying & grouping, connecting, disconnecting, removing, adding, alternating or changing or modifying, updating, replicating or synchronizing, transacting, binding with 3rd party applications, networks, services & devices, routing or redirecting, forwarding, transferring, merging, joining, listing, linking, arranging, scheduling, automating, sequencing and ordering as per workflow & rule based, collecting, receiving, managing, monitoring, registering, accounting & metering, reporting, logging and executing one or more or group or combinations or series or sequences of Multidimensional Active Resources & Actions Provider(s), real or near real time updated Multidimensional Active Resources & Actions, contents from database(s) and service applications from plurality of sources via command scripting language and integrate with any $3^{rd}$ parties applications, services, devices and networks via web services, APIs, SDK, plug-ins, plug & play and any programming & scripting languages.

User can also use one or more or combinations of search Boolean operators including AND (+), OR, NOT (−), Phrases, multiple brackets for multiple inner searches, domain specific semantic and ontology syntax and parameters including one or more domain(s) list, Multidimensional Active Resources & Actions Provider(s) list, service(s) name list, source(s) type, taxonomy categories or classification(s) or cluster(s) list, service type(s) including free or paid or sponsored, preferences including bookmark or save results or export results, rank & hits range, data range, language(s) list, location(s) list, safe search, two way match making preferences, set number of results per page & search up to number of depth(s) of sources, apply one or more filter(s) including ALL, EXACT, ANY, NONE words and one or more or combination of sorting type(s) including ascending & descending order, rank wise, category wise, date & time wise, hit wise, location wise, language wise, availability status wise, price wise (free or paid) with one or more search or command syntax string(s).

User can also concurrently searching for one or more or multiple search string(s) of one or more or multiple fields or categories or taxonomy classifications or clusters and each search results presented in one or more pages via categories tabbed interfaces and each result of each said search results comprising source URL or profile link, full or partial or abstract of content or message or multidimensional active resources & actions or resource or data or source details & URL, category, date & time, ranks & reviews, hit statistics, online status, subscription status, metadata & properties and sorting as per date & time, source, rank, hits, location, language, status and ascending & descending order and presenting individually or in one or more categories group or filtering and user can select one or more search result of said one or more search results related to said one or more search strings and take one or more group actions on said selected one or more search result(s) including bookmarking, filtering, comparing, sorting & ordering, saving, subscribing, un-subscribing, inviting for subscriptions, blocking sources, send messages.

Taxonomy wise Active Note(s) Project Management: User can use project management and workspace for managing plurality of Active Note(s) or request or communication or messaging with plurality of known as well as unknown Multidimensional Active Resources & Actions Provider(s) including searching, matching, book marking, subscribing, attaching, detaching, assigning, federating, planning, aggregating, integrating, distributing, collaborating & communicating, composing, comparing, co-coordinating, orchestrating, classifying & grouping, connecting, disconnecting, removing, adding, alternating or changing or modifying, testing or trialing, updating & upgrading, replicating or synchronizing, transacting, ranking & grading, analyzing, invoking, mapping, binding with $3^{rd}$ party applications, networks, services & devices, filtering, routing or redirecting, forwarding, transferring, merging, joining, listing, linking, arranging, scheduling, automating, sequencing and ordering as per workflow & rule based, choreographing, organizing, recording, configuring or customizing, collecting, receiving, selecting, assigning, managing or administrating, monitoring, programming, registering, certifying, accounting & metering, reporting, logging and subscribing plurality of services of Multidimensional Active Resources & Actions Provider(s) and said project management and workspace & workflow works in multiple users & accounts, multiple messaging to multiple users, multiple remote users, multiple roles or rights & privileges, multiple members, multiple administrators levels, multiple communication clients or applications or services or networks or devices, multiple communication & collaboration channels, multiple scaling and multiple interface styles modes.

The present invention may uses Ontology and Rule based systems and the same is described hereunder.

Ontology ((computer science) a rigorous and exhaustive organization of some knowledge domain that is usually hierarchical and contains all the relevant entities and their relations). In computer science and information science, an ontology is a formal representation of a set of concepts within a domain and the relationships between those concepts. It is used to reason about the properties of that domain, and may be used to define the domain. In theory, ontology is a "formal, explicit specification of a shared conceptualization. An ontology provides a shared vocabulary, which can be used to model a domain—that is, the type of objects and/or concepts that exist, and their properties and relations. Ontologies are used in artificial intelligence, the Semantic Web, systems engineering, software engineering, biomedical informatics, library science, enterprise bookmarking, and information architecture as a of knowledge representation about the world or some part of it. The creation of domain ontologies is also fundamental to the definition and use of an enterprise architecture framework.

The core meaning within computer science is a model for describing the world that consists of a set of types, properties, and relationship types. Exactly what is provided around these varies, but they are the essentials of an ontology. There is also generally an expectation that there be a close resemblance between the real world and the features of the model in an ontology. What ontology has in common in both computer science and in philosophy is the representation of entities, ideas, and events, along with their properties and relations, according to a system of categories. Historically, ontologies arise out of the branch of philosophy known as metaphysics, which deals with the nature of reality—of what exists. This fundamental branch is concerned with analyzing various types or modes of existence, often with special attention to the relations between particulars and universals, between intrinsic and extrinsic properties, and between essence and existence. The traditional goal of ontological inquiry in particular is to divide the world "at its joints", to discover those fundamental categories, or kinds, into which the world's objects naturally fall.

Ontology components: Contemporary ontologies share many structural similarities, regardless of the language in which they are expressed. As mentioned above, most ontologies describe individuals (instances), classes (concepts), attributes, and relations. In this section each of these components is discussed in turn.

Common Components of Ontologies Include:
  Individuals: instances or objects (the basic or "ground level" objects)
  Classes: sets, collections, concepts, classes in programming, types of objects, or kinds of things.
  Attributes: aspects, properties, features, characteristics, or parameters that objects (and classes) can have
  Relations: ways in which classes and individuals can be related to one another
  Function terms: complex structures formed from certain relations that can be used in place of an individual term in a statement
  Restrictions: formally stated descriptions of what must be true in order for some assertion to be accepted as input
  Rules: statements in the form of an if-then (antecedent-consequent) sentence that describe the logical inferences that can be drawn from an assertion in a particular form
  Axioms: assertions (including rules) in a logical form that together comprise the overall theory that the ontology describes in its domain of application. This definition differs from that of "axioms" in generative grammar and formal logic. In those disciplines, axioms include only statements asserted as a priori knowledge. As used here, "axioms" also include the theory derived from axiomatic statements.
  Events: the changing of attributes or relations Domain ontologies and upper ontologies: A domain ontology (or domain-specific ontology) models a specific domain, or part of the world. It represents the particular meanings of terms as they apply to that domain. For example the word card has many different meanings. An ontology about the domain of poker would model the "playing card" meaning of the word, while an ontology about the domain of computer hardware would model the "punch card" and "video card" meanings. An upper ontology (or foundation ontology) is a model of the common objects that are generally applicable across a wide range of domain ontologies. It contains a core glossary in whose terms objects in a set of domains can be described. Since domain ontologies represent concepts in very specific and often eclectic ways, they are often incompatible. As systems that rely on domain ontologies expand, they often need to merge domain ontologies into a more general representation. This presents a challenge to the ontology designer. Different ontologies in the same domain can also arise due to different perceptions of the domain based on cultural background, education, ideology, or because a different representation language was chosen.

At present, merging ontologies that are not developed from a common foundation ontology is a largely manual process and therefore time-consuming and expensive. Domain ontologies that use the same foundation ontology to provide a set of basic elements with which to specify the meanings of the domain ontology elements can be merged automatically. There are studies on generalized techniques for merging ontologies, but this area of research is still largely theoretical.

Present invention helps in creating and updating or developing all types and categories of human related all possible activities and related all types of actions & experience specific ontology for all types of domains, people, companies, manufacturing, processing, education, qualification, learning, locations, languages, countries (world), religions, societies, casts, jobs, works, businesses, services, fields, career, courses, professionals, branded products and services, procedures, knowledge domains, activities, purposes, age group, income group, qualification group, hobby, interest and like which are based on collaborative filtering and ranking and provides all types of human activities specific ready to use reusable list of all possible concept specific all types of actions or knowledge or suggestions or ways or directions or guidance or steps or procedures or to do and like. Various types of humans of various fields or locations or behavior or qualification or age group or income group or job or professional can do many types of day to day activities and needs solutions or tips or guidance or suggestion or helps or supports in doing each said activity of each said type of each human or individual or person or entity.

Ontology engineering (or ontology building) is a subfield of knowledge engineering that studies the methods and methodologies for building ontologies. It studies the ontology development process, the ontology life cycle, the methods and methodologies for building ontologies, and the tool suites and languages that support them. Ontology engineering aims to make explicit the knowledge contained within software applications, and within enterprises and business procedures for a particular domain. Ontology engineering offers a direction towards solving the interoperability problems brought about by semantic obstacles, such as the obstacles related to the definitions of business terms and software classes. Ontology engineering is a set of tasks related to the development of ontologies for a particular domain.

Individuals: Individuals (instances) are the basic, "ground level" components of an ontology. The individuals in an ontology may include concrete objects such as people, animals, tables, automobiles, molecules, and planets, as well as abstract individuals such as numbers and words (although there are differences of opinion as to whether numbers and words are classes or individuals). Strictly speaking, an ontology need not include any individuals, but one of the general purposes of an ontology is to provide a means of classifying individuals, even if those individuals are not explicitly part of the ontology.

Classes: Classes—concepts that are also called type, sort, category, and kind—can be defined as an extension or an intension. According to an extensional definition, they are abstract groups, sets, or collections of objects. According to an intentional definition, they are abstract objects that are defined by values of aspects that are constraints for being member of the class. The first definition of class results in ontologies in which a class is a subclass of collection. The second definition of class results in ontologies in which collections and classes are more fundamentally different. Classes may classify individuals, other classes, or a combination of both.

Some Examples of Classes:
   Person, the class of all people, or the abstract object that can be described by the criteria for being a person.
   Vehicle, the class of all vehicles, or the abstract object that can be described by the criteria for being a vehicle.
   Car, the class of all cars, or the abstract object that can be described by the criteria for being a car.
   Class, representing the class of all classes, or the abstract object that can be described by the criteria for being a class.
   Thing, representing the class of all things, or the abstract object that can be described by the criteria for being a thing (and not nothing).

Ontologies vary on whether classes can contain other classes, whether a class can belong to itself, whether there is a universal class (that is, a class containing everything), etc. Sometimes restrictions along these lines are made in order to avoid certain well-known paradoxes. The classes of an ontology may be extensional or intentional in nature. A class is extensional if and only if it is characterized solely by its membership. More precisely, a class C is extensional if and only if for any class C', if C' has exactly the same members as C, then C and C' are identical. If a class does not satisfy this condition, then it is intentional. While extensional classes are more well-behaved and well-understood mathematically, as well as less problematic philosophically, they do not permit the fine grained distinctions that ontologies often need to make. For example, an ontology may want to distinguish between the class of all creatures with a kidney and the class of all creatures with a heart, even if these classes happen to have exactly the same members. In most upper ontologies, the classes are defined intentionally. Intentionally defined classes usually have necessary conditions associated with membership in each class. Some classes may also have sufficient conditions, and in those cases the combination of necessary and sufficient conditions makes that class a fully defined class.

Importantly, a class can subsume or be subsumed by other classes; a class subsumed by another is called a subclass (or subtype) of the subsuming class (or super type). For example, Vehicle subsumes Car, since (necessarily) anything that is a member of the latter class is a member of the former. The subsumption relation is used to create a hierarchy of classes, typically with a maximally general class like anything at the top, and very specific classes like 2002 Ford Explorer at the bottom. The critically important consequence of the subsumption relation is the inheritance of properties from the parent (subsuming) class to the child (subsumed) class. Thus, anything that is necessarily true of a parent class is also necessarily true of all of its subsumed child classes. In some ontologies, a class is only allowed to have one parent (single inheritance), but in most ontologies, classes are allowed to have any number of parents (multiple inheritance), and in the latter case all necessary properties of each parent are inherited by the subsumed child class. Thus a particular class of animal (HouseCat) may be a child of the class Cat and also a child of the class Pet.

A partition is a set of related classes and associated rules that allow objects to be classified by the appropriate subclass. The rules correspond with the aspect values that distinguish the subclasses from the superclasses. For example, to the right is the partial diagram of an ontology that has a partition of the Car class into the classes 2-Wheel Drive Car and 4-Wheel Drive Car. The partition rule (or subsumption rule) determines if a particular car is classified by the 2-Wheel Drive Car or the 4-Wheel Drive Car class. If the partition rule(s) guarantee that a single Car cannot be in both classes, then the partition is called a disjoint partition. If the partition rules ensure that every concrete object in the super-class is an instance of at least one of the partition classes, then the partition is called an exhaustive partition.

Attributes: Objects in an ontology can be described by relating them to other things, typically aspects or parts. These related things are often called attributes, although they may be independent things. Each attribute can be a class or an individual. The kind of object and the kind of attribute determine the kind of relation between them. A relation between an object and an attribute express a fact that is specific to the object to which it is related. For example the Ford Explorer object has attributes such as:

<has as name> Ford Explorer
<has by definition as part> door (with as minimum and maximum cardinality: 4)
<has by definition as part one of > {4.0 L engine, 4.6 L engine}
<has by definition as part> 6-speed transmission The value of an attribute can be a complex data type; in this example, the related engine can only be one of a list of subtypes of engines, not just a single thing.

Relationships: Relationships (also known as relations) between objects in an ontology specify how objects are related to other objects. Typically a relation is of a particular type (or class) that specifies in what sense the object is related to the other object in the ontology. For example in the ontology that contains the concept Ford Explorer and the concept Ford Bronco might be related by a relation of type <is defined as a successor of>. The full expression of that fact then becomes: Ford Explorer is defined as a successor of: Ford Bronco This tells us that the Explorer is the model that replaced the Bronco. This example also illustrates that the relation has a direction of expression. The inverse expression expresses the same fact, but with a reverse phrase in natural language.

Much of the power of ontologies comes from the ability to describe relations. Together, the set of relations describes the semantics of the domain. The set of used relation types (classes of relations) and their subsumption hierarchy describe the expression power of the language in which the ontology is expressed. The most important type of relation is the subsumption relation (is-a-superclass-of, the converse of is-a, is-a-subtype-of or is-a-subclass-of). This defines which objects are classified by which class. For example we have already seen that the class Ford Explorer is-a-subclass-of 4-Wheel Drive Car, which in turn is-a-subclass-of Car: The addition of the is-a-subclass-of relationships creates a hierarchical taxonomy; a tree-like structure (or, more generally, a partially ordered set) that clearly depicts how objects relate to one another. In such a structure, each object is the 'child' of a 'parent class' (Some languages restrict the is-a-subclass-of relationship to one parent for all nodes, but many do not). Another common type of relations is the meronymy relation, written as part-of, that represents how objects combine together to form composite objects. For example, if we extended our example ontology to include concepts like Steering Wheel, we would say that a "Steering Wheel is-by-definition-a-part-of-a Ford Explorer" since a steering wheel is always one of the components of a Ford Explorer. If we introduce meronymy relationships to our ontology, we find that this simple and elegant tree structure quickly becomes complex and significantly more difficult to interpret manually. It is not difficult to understand why; a class of which is described that there is always a member that is a part of a member of another class might also have a member that is part of a member of a third class. Consequently, classes may be part of more than one whole class. The structure that emerges is known as a directed acyclic graph.

As well as the standard is-a-subclass-of and is-by-definition-a-part-of-a relations, ontologies often include additional types of relations that further refine the semantics they model. Ontologies might distinguish between different categories of relation types. For example:
 relation types for relations between classes
 relation types for relations between individuals
 relation types for relations between an individual and a class
 relation types for relations between a single object and a collection
 relation types for relations between collections Relation types are sometimes domain-specific and are then used to store specific kinds of facts or to answer particular types of questions. If the definitions of the relation types are included in an ontology, then the ontology defines its own ontology definition language. For example in the domain of automobiles, we might need a made-in type relationship which tells us where each car is built. So the Ford Explorer is made-in Louisville. The ontology may also know that Louisville is-located-in Kentucky and Kentucky is-classified-as-a state and is-a-part-of the U.S. Software using this ontology could now answer a question like "which cars are made in the U.S.?"

Controlled vocabularies provide a way to organize knowledge for subsequent retrieval. They are used in subject indexing schemes, subject headings, thesauri and taxonomies. Controlled vocabulary schemes mandate the use of predefined, authorized terms that have been preselected by the designer of the vocabulary, in contrast to natural language vocabularies, where there is no restriction on the vocabulary.

Taxonomy is the practice and science of classification. A taxonomy, or taxonomic scheme, is a particular classification ("the taxonomy of . . . "), arranged in a hierarchical structure. Typically this is organized by supertype-subtype relationships, also called generalization-specialization relationships, or less formally, parent-child relationships. In such an inheritance relationship, the subtype by definition has the same properties, behaviors, and constraints as the supertype plus one or more additional properties, behaviors, or constraints. For example, car is a subtype of vehicle. So any car is also a vehicle, but not every vehicle is a car. Therefore, a type needs to satisfy more constraints to be a car than to be a vehicle. Almost anything—animate objects, inanimate objects, places, concepts, events, properties, and relationships—may then be classified according to some taxonomic scheme. In an even wider sense, the term taxonomy could also be applied to relationship schemes other than parent-child hierarchies, such as network structures with other types of relationships. Taxonomies may then include single children with multi-parents, for example, "Car" might appear with both parents "Vehicle" and "Steel Mechanisms"; to some however, this merely means that 'car' is a part of several different taxonomies. A taxonomy might also be a simple organization of kinds of things into groups, or even an alphabetical list. In current usage within Knowledge Management, taxonomies are considered narrower than ontologies since ontologies apply a larger variety of relation types. Mathematically, a hierarchical taxonomy is a tree structure of classifications for a given set of objects. It is also named Containment hierarchy. At the top of this structure is a single classification, the root node that applies to all objects. Nodes below this root are more specific classifications that apply to subsets of the total set of classified objects. The progress of reasoning proceeds from the general to the more specific.

Rule-based systems: In computer science, rule-based systems are used as a way to store and manipulate knowledge to interpret information in a useful way. They are often used in artificial intelligence applications and research. A classic example of a rule-based system is the domain-specific expert system that uses rules to make deductions or choices. For example, an expert system might help a doctor choose the correct diagnosis based on a cluster of symptoms, or select tactical moves to play a game.

Rule-based programming attempts to derive execution instructions from a starting set of data and rules, which is a more indirect method than using a programming language which lists execution steps straightforwardly.

A typical rule-based system has four basic components:
A list of rules or rule base depending upon the knowledge base.
A rule engine or semantic reasoner, which infers information or takes action based on the interaction of input and the rule base.
Temporary working memory.
A user interface or other connection to the outside world through which input and output signals are received and sent.

An expert system is software that attempts to reproduce the performance of one or more human experts, most commonly in a specific problem domain, and is a traditional application and/or subfield of artificial intelligence. A wide variety of methods can be used to simulate the performance of the expert however common to most or all are 1) the creation of a so-called "knowledgebase" which uses some knowledge representation formalism to capture the Subject Matter Experts (SME) knowledge and 2) a process of gathering that knowledge from the SME and codifying it according to the formalism, which is called knowledge engineering.

Expert systems may or may not have learning components but a third common element is that once the system is developed it is proven by being placed in the same real world problem solving situation as the human SME, typically as an aid to human workers or a supplement to some information system There are two main methods of reasoning when using inference rules: backward chaining and forward chaining.

Forward chaining starts with the data available and uses the inference rules to conclude more data until a desired goal is reached. An rule engine using forward chaining searches the inference rules until it finds one in which the if clause is known to be true. It then concludes the then clause and adds this information to its data. It would continue to do this until a goal is reached. Because the data available determines which inference rules are used, this method is also called data driven.

Backward chaining starts with a list of goals and works backwards to see if there is data which will allow it to conclude any of these goals. A rule engine using backward chaining would search the inference rules until it finds one which has a then clause that matches a desired goal. If the if clause of that inference rule is not known to be true, then it is added to the list of goals. For example, suppose a rule base contains
1. If Fritz is green then Fritz is a frog.
2. If Fritz is a frog then Fritz hops.

Suppose a goal is to conclude that Fritz hops. The rule base would be searched and rule (2) would be selected because its conclusion (the then clause) matches the goal. It is not known that Fritz is a frog, so this "if" statement is added to the goal list. The rule base is again searched and this time rule (1) is selected because its then clause matches the new goal just added to the list. This time, if clause (Fritz is green) is known to be true and the goal that Fritz hops is concluded. Because the list of goals determines which rules are selected and used, this method is called goal driven.

Expert System Architecture

The following general points about expert systems and their architecture have been illustrated.
1. The sequence of steps taken to reach a conclusion is dynamically synthesized with each new case. It is not explicitly programmed when the system is built.
2. Expert systems can process multiple values for any problem parameter. This permits more than one line of reasoning to be pursued and the results of incomplete (not fully determined) reasoning to be presented.
3. Problem solving is accomplished by applying specific knowledge rather than specific technique. This is a key idea in expert systems technology. It reflects the belief that human experts do not process their knowledge differently from others, but they do possess different knowledge. With this philosophy, when one finds that their expert system does not produce the desired results, work begins to expand the knowledge base, not to re-program the procedures.

There are various expert systems in which a rule base and a rule engine cooperate to simulate the reasoning process that a human expert pursues in analyzing a problem and arriving at a conclusion. In these systems, in order to simulate the human reasoning process, a vast amount of knowledge needed to be stored in the knowledge base. Generally, the knowledge base of such an expert system consisted of a relatively large number of "if then" type of statements that were interrelated in a manner that, in theory at least, resembled the sequence of mental steps that were involved in the human reasoning process.

A Subject Matter Expert (SME) is a person who is an expert in a particular area. In software engineering environments, the term is used to describe professionals with expertise in the field of application but without technical project knowledge. SMEs is often asked to review, improve and approve technical work, to guide others, and to teach.

A production system (or production rule system) is a computer program typically used to provide some form of artificial intelligence, which consists primarily of a set of rules about behavior. These rules, termed productions, are a basic representation found useful in AI planning, expert systems and action selection. A production system provides the mechanism necessary to execute productions in order to achieve some goal for the system.

Productions consist of two parts: a sensory precondition (or "IF" statement) and an action (or "THEN"). If a production's precondition matches the current state of the world, then the production is said to be triggered. If a production's action is executed, it is said to have fired. A production system also contains a database, sometimes called working memory, which maintains data about current state or knowledge, and a rule interpreter. The rule interpreter must provide a mechanism for prioritizing productions when more than one is triggered.

System provides default domain specific readymade or customize top level ontology to all users and based on that user can create or submit one or more or plurality of Active Notes and associate one or more ontology. Thus top system ontology and user generated active note(s) ontology and related ranked multidimensional resources & actions comprising all types of activities and associated actions related to life of all types of users or people or entities will create complete life specific ontology (activities & actions) and system stores, updates and indexes all ranked resources of said all users and make them searchable for other users.

Step by Step Details:

Present invention provides a device, system and method of processing active note(s) and associated active resources & actions related to life stream using a network device in communication with a client device comprising:
identifying the note as active note(s) by active note(s) provider(s);
determining a set of at least one target responders or active resources & actions provider(s) by active note(s) provider(s);
send or submit the said active note(s) by active note(s) provider(s) to the central server;

receiving, from the client device, the active note(s) of active note(s) provider(s) by the central server;

determining a set of at least one target responders or active resources & actions provider(s) by the central server;

sending or presenting, to each target responder or active resources & actions provider(s), a representation of the active note(s);

receiving by each target responder or active resources & actions provider(s), a representation of the active note(s) to providing a multidimensional active resources & actions for the active note(s);

identifying a resource utilized for a multidimensional active resources & actions and produce multidimensional active resources & actions;

determining at least one concept based on an analysis of the one or more active note(s);

optionally clarify the active note(s) and related one or more concept(s) by active resources & actions provider(s) with the active note(s) provider(s);

optionally performing a search of active resources & actions over each of the one or more concept based at least on the active note(s) to generate a plurality of multidimensional active resources & actions;

identifying and drafting one or more concept-specific active resources & actions based on the at least one concept;

submitting said one or more multidimensional active resources & actions for said active note(s) to the central server;

receiving, storing, updating, validating, formatting, processing and indexing from each of at least a portion of the target responders or active resources & actions provider(s), a response or multidimensional active resources & actions;

sending the response or active resources & actions with advertisements to the client device;

receiving, viewing, organizing, categorizing, sharing, selecting and using active note(s) related one or more multidimensional active resources & actions and assign rank and provide comments to selected or used said one or more multidimensional active resources & actions by active note(s) provider(s);

updating said one or more multidimensional active resources & actions related rank and comments to the central server; and providing search engine for searching said active note(s) specific ranked multidimensional active resources & actions based on one or more search criteria to the searchers by the central server.

Wherein said receiving, selecting, presenting and supplying may be performed in real or near real time.

System allow the user or active note(s) provider(s) to creating and updating connections list(s) based on contacts, invitation, find people, searching & matching, subscribing, book marking and match making preferences.

Systems and methods of the invention allows the active note(s) provider(s) or active resources & actions provider(s) to submit one or more public, private or shared domain or subject or purpose or categories specific profile(s) from the client device to the central server for storing, indexing and updating of said submitted profile(s) for matchmaking of active note(s) and/or active note(s) provider(s) with the active resources & actions providers and/or active resources & actions by the central server.

Systems and methods of the invention allows the user or active note(s) provider(s) to updating life stream timeline related note(s) & resources including text, messages, emails, communication related messages & resources, web links, connections, videos, images, photos, albums, graphics, multi medias, audio, voice, any types of files, documents, databases, applications & services, updated resources from connected people or internal or external sources & services, any types of free form or scanned or structured resources, user's or connected users' generated contents like publications, blogs, news, events, updates, notes, experiences, reviews, discussion, likes & dislikes, activities, solutions, sharing, purchases, brands use and want to use, history and everything related to user's and connected users' life which are useful to user's and other like minded or similar users for similar activities.

Systems and methods of the invention allows the user or active note(s) provider(s) to associate one or more taxonomies, ontology, categories, semantic syntax, meaning, controlled vocabulary, keyword(s), comments, notes and metadata to one or more life stream, wherein associating one or more taxonomies to said life stream for organizing life stream comprising allowing user or active note(s) provider(s) to download or synchronize or update one or more default top level or parent system taxonomies from the central server and allow user to append or update one or more user created taxonomies of one or more levels to said default top levels or main system taxonomies.

Systems and methods of the invention allows the user or active note(s) provider(s) to sharing or synchronizing one or more categories or taxonomies specific life stream or selected one or more active note(s) and related multidimensional active resources & actions with one or more selected or matched users or contacts or connections or subscribers.

Systems and methods of the invention allows the user or active note(s) provider(s) to subscribing one or more categories or taxonomies or list(s) specific public or shared life stream(s) of other users or active notes providers based on one or more search criteria and connections with permission.

Systems and methods of the invention allows the user or active note(s) provider(s) to allow other users to subscribe user's one or more categories or taxonomies or list(s) specific public or shared life stream(s) with permission.

Systems and methods of the invention allows the user or active note(s) provider(s) to subscribe other users' one or more categories list(s) of public or shared life stream(s) and/or create one or more categories list(s) of other users' public or shared life stream(s) and make the list(s) as public, private or shared and allow other users to subscribe said one or more list(s).

Active note(s) provider(s) can identify the note as active note(s) comprising allowing user or active note(s) provider(s) to make any note(s) of life stream(s) as active or create new active note(s) and determining target responders or active resources & actions provider(s) or select default auto match option for submitting or sending or updating or synchronizing said one or more active note(s) to one or more selected or subscribed or bookmarked or matched multidimensional active resources & actions provider(s) for multidimensional active resources & actions by active note(s) provider(s) via central server.

Any active note(s) may comprising one or more statement(s), details, story, blog, details, descriptions, message(s), text, image(s), video(s), query, keyword(s), phrase(s), Boolean operators, rules, condition(s), meanings, semantic syntax, ontology with metadata including categories, taxonomies, keyword(s), source id, source profile(s), date & time, location and like.

Active notes provider(s) can determining the set of at least one target responders or active resources & actions provider(s) for submitting or sending or publishing or updating one or more active note(s) to one or more active resources & actions provider(s) comprises allowing user or active notes provider(s) to selectively including one or more responder(s) or active resources & actions provider(s) in the set based on contacts, connections, group(s) or list(s), subscriptions, bookmarks, searching & selection, two way auto match making preferences, publishing in public or one or more filtered cluster(s) or domain(s) or categories or keyword(s) or like.

Any active note(s) may related to any types of activities, purpose, updated status, reason, thought, motive, logic, act, intention, point, idea, what are doing currently, want to do something, did something, aim, goal, ambition, desire, want, wish, need, activity, requirement, request, query, question, appeal, end, object, matter, plan, target, task, issue, subject, topic, project, case, event, problem, attempt, try, what next thing user do, what happen next, likes & dislikes, hobby, selection or choice, around anything related to user's or entity's environment like brands & services using, brands & services want to use, before spent money, before or currently doing something, likes or dislike, every types of experiences, reviews, interest, relation, connected people, all types of works, activities, actions, jobs, procedures, to do, about user, user's life, health, education, travel, entertainment, life style, finance, job, business, career, learning, training, food, habit, hobby and like.

Wherein the said active notes provider(s) and multidimensional active resources & actions provider(s) may including one or more persons or individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises, virtually any person, group of persons, businesses, organizations, service providers, data providers, application developer or even a computing structure including a program, data & service source, or an entity that exists as a particular and discrete unit and like.

The central server can receiving, storing, updating, validating, formatting, indexing and processing said each active note(s) from said one or more active note(s) providers.

The central server can determining the set of at least one target responders or active resources & actions provider(s) for routing or submitting or sending or publishing or updating one or more active note(s) of one or more active note(s) provider(s) to one or more active resources & actions provider(s) comprises searching a database for a multidimensional active resources & actions providers matching the active note(s) based on associated metadata, rank, two way auto match making preferences of active note(s) provider(s) including one or more taxonomies, categories, keywords, ontology, meaning, semantic syntax, metadata, controlled vocabulary, thesaurus, phrases, Boolean operators, rules, conditions and active note(s) provider(s)' one or more selections or subscriptions or connections of active resources & actions providers.

Systems and methods of the invention allows the active resources & actions provider(s) to collaborating with one or more other active resources & actions provider(s) based on contacts, connections, invitation, searching & matching, subscribing, book marking and two way auto match making preferences and find public active resources & actions provider(s) from central server or internal or external social or other networks & services.

Systems and methods of the invention allows each target responders or active resources & actions provider(s) to receive all active note(s) with metadata & system data automatically from all pre defined or subscribed or connected active note(s) providers via central server or receive one or more active note(s) with metadata & system data from one or more selected or connected or subscribed or two way auto match making preference based active note(s) provider(s) or search, book mark, select and receive active note(s) or received active note(s) assigned from other active resources & actions provider(s) for collaboration from the central server and presenting said received one or more active note(s) as per multidimensional active resources & actions provider's choice and categories as per sources including all or public or expert or subscribers or connected or group(s) or list(s) or assigned sources.

Multidimensional active resources & actions providers can identify the resource utilized for a multidimensional active resources & actions comprising identifying a resource utilized for a multidimensional active resources & actions in association with a keyword(s) contained in the active note(s); and distributing, providing, sharing, synchronizing, updating, displaying the resource to said active resources & actions providers registered to accept active note(s) related to the one or more keyword(s) or profile(s) or taxonomies or ontology or categories like field, subject, topic, domain, expertise, interest, services and like.

Multidimensional active resources & actions providers can determining at least one concept based on an analysis of the one or more active note(s) comprising determining the one or more concept(s) base on analysis of the active note(s), active note(s) provider's one or more part of life stream, past active note(s) & related ranked resources, active note provider's profile(s) covering preferences, personal profile, rank, points, levels, domain specific updated profiles and like.

One or more multidimensional active resources & actions providers can clarify the said active note(s) and related one or more concept(s) with the said related active note(s) provider(s) before providing multidimensional active resources & actions.

Systems and methods of the invention allows active note(s) provider(s) or active resources & actions provider(s) to search active note(s) and/or concept specific one or more active resources & actions based on one or more concepts, search criteria, keyword(s), categories, meanings, taxonomies, ontology, semantic syntax, conditions, rules, Boolean operators, phrases, search query and messages from local and/or online central server and/or external sources & services integrated by API and/or connected social or personal networks or from any selected connections.

Systems and methods of the invention allows active resources & actions provider(s) to search active note(s) specific one or more active resources & actions or active note(s) provider(s) specific public or shared or filtered life stream based on one or more search criteria, keyword(s), categories, meanings, taxonomies, ontology, semantic syntax, conditions, rules, Boolean operators, phrases, search query and messages.

wherein said one or more multidimensional active resources & actions provider(s) can identifying and drafting one or more concept-specific active resources & actions based on the at least one concept based on active resources & actions provider's experience, analysis, human mind and sources of knowledge, information, database(s), resources from connected users and other Active Resources & Actions, connections, experts, paid services, one or more applications, services, online web sites, books and like.

Systems and methods of the invention allows one or more active resources & actions provider(s) to sent or update or synchronize one or more active resource(s) & action(s)

related to one or more active note(s) of one or more active note(s) provider(s) to the client device via central server.

The said multidimensional active resources & actions may comprising any types of resources including text, messages, emails, communication messages & resources, web links, connections, videos, images, photos, albums, graphics, multi medias, audio, voice, any types of files, documents, databases, applications, services, internal or external sources of updated resources, any types of free form or scanned or structured resources by active resources & actions provider(s) or connected active resources & actions provider(s) including articles, publications, blogs, news, events, experiences, reviews, discussion, actions, sharing, suggested brands, providing multiple suggested resources & action(s) including one or more actions, what to do, better way to do, more ways, questions & related answers, answers, suggestions, solutions, guidance, helps, finance, supplies, information, knowledge, tips & tricks, training, learning, match making, ideas, what, where, when, why and how like information, one or more actions, suggestions, solution, direction, guidance, execution plan, step by step procedures, to do, tips & tricks, more particularly, but not exclusively to using a community to provides personalized or customized multi model or multidimensional active resources & actions for active note(s), result-oriented actions, positive steps, active resources designed to actively promote and advance the user's status, any measures taken to rectify conditions, acts or deeds used to remedy a situation, solution for removing an error, or adjust a condition, how to carry out a task, how to execute the things, planned series of actions, tasks or steps designed to achieve an objective or goal, guide the implementation or improvements of any types of process including task assignments, milestones, timelines, resource allocations, data collection methodology, and evaluation, step or series of steps to be taken, detailed description of the steps used to implement a strategic plan, a plan to determine what information is missing or pending, where and when to collect this information, and who will need the information and anything related to active note(s) which are useful to active note(s) provider(s) and like.

Systems and methods of the invention allows multidimensional active resources & actions provider(s) to associate one or more application(s) and/or service(s) and metadata including date & time, resources type, resource structured tag type, source, one or more categories, taxonomies, controlled vocabulary, keyword(s), ontology with said active resource(s) & action(s).

Central server can receiving, storing, updating, validating, formatting, processing and indexing from each of at least a portion of the target responders or active resources & actions provider(s), a response or multidimensional active resources & actions for sending said active resources & actions related to said active note(s) to said active note(s) provider's client device.

Systems and methods of the invention allows user or active note(s) provider(s) to submit and updates one or more public, private or shared active note(s) and related active resources & actions with rank, comments, details and metadata from the client device to the central server for storing, indexing and updating said active note(s) and related ranked active resources & actions.

The central server can route or send or update the said active note specific response or active resources & actions with advertisements to the user on the client device.

Systems and methods of the invention allows the user or active note(s) provider(s) to receive manually or automatically all or one or more selected multidimensional active resources & actions with metadata & system data from all or one or more selected active resources & actions providers related to one or more selected active note(s) from the central server and presenting as per user's choice or categories as per sources including all or public or expert or subscribed or connected sources.

Systems and methods of the invention allows the user or active note(s) provider(s) to set status to one or more one or more multidimensional active resources & actions like "Accept" or "Selected" or "Pending", "Doing", "Done", "Do not like", "Not Possible" 'Reject", "Suggest Alternate", "Like" and like, assign ranks and provide details of use or experience or comments on one or more multidimensional active resources & actions and submit said updates to the central server for updating, storing, validating, processing and indexing said updates and making them searchable for other users.

Systems and methods of the invention allows the active resources & actions provider(s) to assign rank to selected one or more active note(s) from one or more active note(s) provider(s).

In one embodiment, at least one of receiving the active note(s), sending the representation of the active note(s), receiving the response or active resource(s) & action(s), or sending the response or active resource(s) & action(s) is performed using an instant messaging mechanism.

Systems and methods of the invention allows the multidimensional active resources & actions provider(s) to set status to one or more active note(s) like "Select", "Reject", "Like", "Pending", "Sent" and like, assign ranks and provide details or comments to one or more active note(s) and submit, update, store, validate, process and indexes said ranked active note(s) with multidimensional active resources & actions to the central server for making them searchable for searchers.

In one embodiment, each of receiving the active note(s), sending the representation of the active note(s), receiving the response or active resource(s) & action(s), and sending the response or active resource(s) & action(s) is performed using a communication mechanism to facilitate the client device sending the active note(s) and receiving the response or active resource(s) & action(s) within an instant messaging session.

Wherein sending the representation of the active note(s) and receiving the response or active resource(s) & action(s) is performed within an instant messaging session.

The active note(s) source may comprises one of a user computer system, a digital active note(s) source, a user or active note(s) provider(s) application, a telephone or mobile, a smart device, an automated active note(s) source, a sensor systems, a human mind, any types of languages, a image, a video, a file, a translation system and a speech or voice active note(s) source.

In the present system either the active note(s) provider or the active resources & actions provider(s) can modify the active note(s) during the request and response process.

Present system further comprising transcribing a speech active note(s) into a text active note(s) and providing a voice message as multidimensional active resources & actions.

The active note(s) source may comprise a cellular telephone or a mobile device and the active note(s) comprises a text message.

The multidimensional active resources & actions comprise a text message, images, videos displayed by the cellular telephone.

Systems and methods of the invention further comprising presenting an advertisement to a user or active note(s) provider(s) during the receiving, selecting, presenting and supplying and allowing an active resources & actions provider(s) accepting an active note(s) to designate the advertisement.

Advertisers may bid for position and placement and timing of advertisements associated with keywords on a user's or active note(s) provider's GUI. Advertisers may bid for position and placement and timing of ads associated with keywords on the active resources & actions provider's GUI and the active resources & actions providers can optionally pick which advertisement is presented.

System can determine whether the active note(s) has been previously responded; and providing previous responses responsive to the determining.

A system for processing a active note(s) of active note(s) provider(s) from a client device comprising: at least one network device containing program logic to perform the method; and a plurality of responder(s) or active resource(s) & action(s) provider(s) devices in communication with the at least one network device, containing program logic to perform actions including: receiving and displaying a active note(s); and sending an active resource(s) & action(s) in an instant message.

A system for processing a active note(s) from a client device, comprising: a transceiver to send and receive data over the network; and a processor that is operative to perform actions, including: receiving a active note(s) from the client device; sending, to each of a plurality of target responders or active resource(s) & action(s) provider(s), a representation of the active note(s); receiving a plurality of responses or active resource(s) & action(s) from the plurality of target responders or active resource(s) & action(s) provider(s); aggregating the plurality of responses or active resource(s) & action(s) to produce an aggregated response including at least two or active resource(s) & action(s) items; and sending the aggregated response or active resource(s) & action(s) to the client device, wherein at least one of receiving the active note(s), sending the representation of the active note(s), receiving the plurality of responses or multidimensional active resources & actions, or sending the aggregated response is performed using an instant messaging mechanism.

A network device for processing a active note(s) from a client device, comprising: means for communicating with a client device; means for communicating with a plurality of responder or active resource(s) & action(s) provider(s) devices; means for responding to an active note(s) from the client device by communicating with the plurality of responder or active resource(s) & action(s) provider(s) devices, said means including logic to aggregate responses or active resource(s) & action(s) from the responder or active resource(s) & action(s) provider(s) devices and provide an indication of a number of received responses corresponding to at least one active resource & action in the aggregated response, wherein the means for communicating with the client device of active note(s) provider(s) and the means for communicating with the plurality of responder devices of active resource(s) & action(s) provider(s) facilitate providing the aggregate response or active resource(s) & action(s) in real time.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 7 illustrates example of graphical user interface (GUI) for the central server search engine.

DETAILED DESCRIPTION OF THE DRAWINGS

Illustrative Operating Environment

Figure 1:
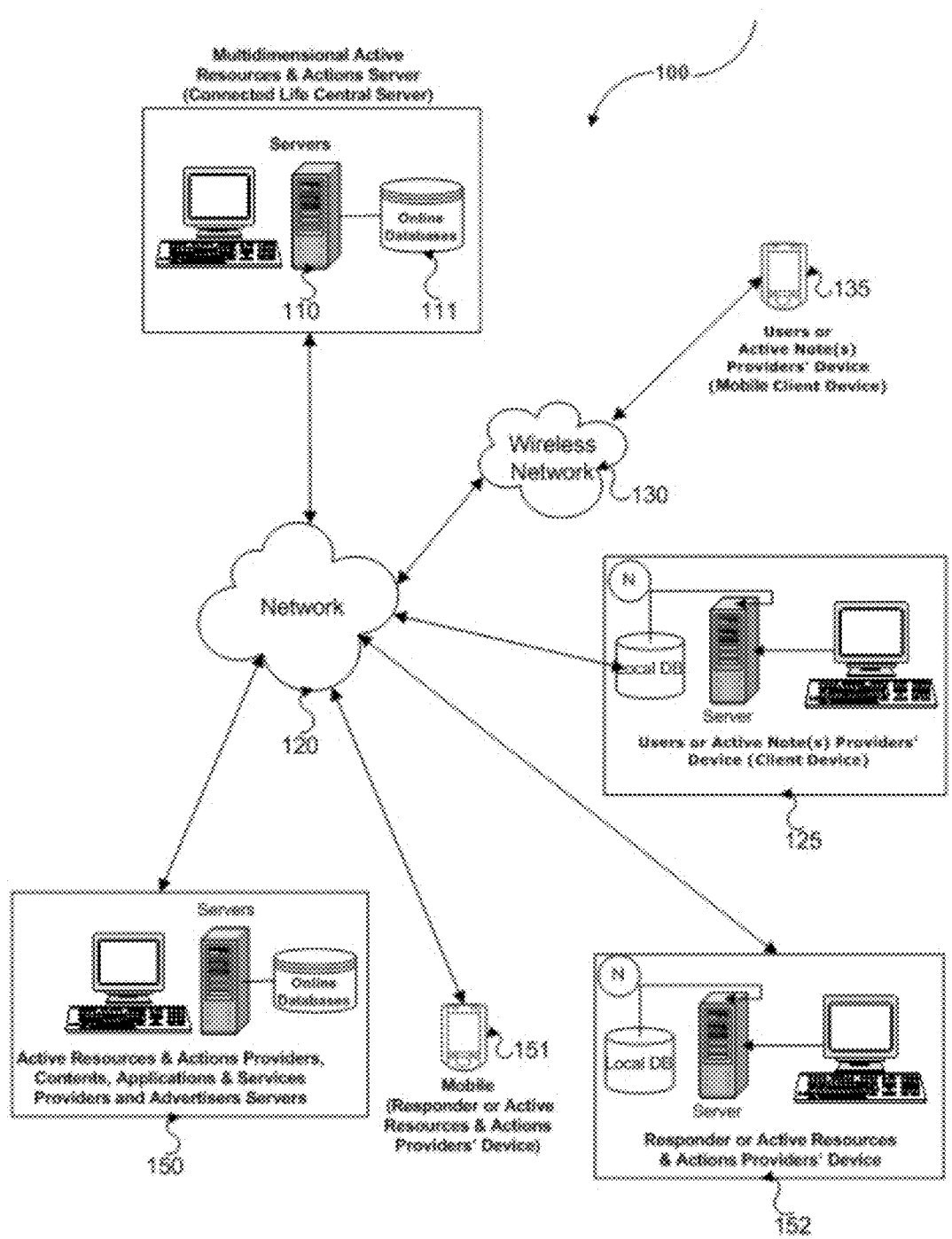
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes a client device, in particular mobile device 135 and personal computer 125. The system also includes wireless network 130, central server 110, Active Resources & Actions Providers, Contents, Applications & Services Providers and Advertisers Servers 150, network 120, and responder or active resources & actions provider(s) client devices 150-152.

A variety of client devices may be employed in accordance with the invention. The client devices may include mobile devices, digital home clients such as personal computers and media centers, and other client devices. Generally, mobile device 135 may include virtually any portable computing device capable of receiving and sending a message over a network, such as network 130, or the like. Mobile device 135 may also be described generally as a client device that is configured to be portable. Mobile device 135 may have the capability of connecting to a network using wireless technology, wired technology, or a combination of both wired and wireless technologies. Thus, mobile device 135 may include virtually any portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, sensors, laptop computers, wearable computers, tablet computers, integrated devices combining one or more of the preceding devices, and the like.

As such, mobile device 135 typically ranges widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile device 135 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile device 135 may uniquely identify itself through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to central server 110 or other computing devices.

Mobile device 135 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as central server 110, another web server, or the like. However, the present invention is not limited to these message protocols, and virtually any other message protocol may be employed.

Mobile device 135 may be further configured to enable a user to participate in communications sessions, such as IM sessions. As such, mobile device 135 may include a client application that is configured to manage various actions on behalf of the client device. For example, the client application may enable a user to interact with the browser application, email application, IM applications, SMS application, and the like. Generally, instant messaging provides ability for at least two computing devices to exchange messages in real time.

Mobile device 135 may further be configured to include a client application that enables the end-user to log into an end-user account that may be managed by a network application. Such an end-user account, for example, may be configured to enable the end-user to receive emails, send/receive IM messages, SMS messages, access selected web pages, maintain a digital wallet, or the like.

Network 130 is configured to couple mobile device 135 & Personal Computer 125, as well as other client devices not illustrated, and their components, with other network devices, such as central server 110, and the like. Network 130 is configured to couple responder client devices 150-152 with central server 110.

Though for illustrative purposes network 130 and network 120 are shown separately, in various environments employing the present invention, network 130 and network 120 may be the same network, different networks, or different networks including a combination of overlapping components and distinct components. The discussion herein that describes network 130 may therefore be applicable to describe network 120.

Network 130 may include any of a variety of wired or wireless sub-networks that may further overlay stand-alone ad-hoc networks, and the like, to provide an infrastructure-oriented connection for mobile device 135. Such sub-networks may include mesh networks, Wireless LAN (WLAN) networks, cellular networks, and the like. Additionally, network 130 may connect to mobile devices with a wired connection, such as cable, phone lines, Ethernet wires, and the like. Network 130 may include wide area networks, such as the Internet. The invention may be used either generally with networks, specifically with wireless networks, or with various combinations of wireless and wired networks.

Network 130 may further include an autonomous system of terminals, gateways, routers, and the like connected by wireless radio links, and the like. These connectors may be configured to move freely and randomly and organize themselves arbitrarily, such that the topology of network 130 may change rapidly.

Network 130 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 135 with various degrees of mobility. For example, network 130 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 130 may include virtually any communication mechanism by which information may travel between mobile device 135 and another computing device, network, and the like.

Network 130 may further include or employ one or more network gateways (not shown) that serve as intermediaries between mobile device 135 and other network devices, such as central server 110. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

In one embodiment, network 130 may include one or more components of an instant messaging service that operates to facilitate communication of instant messaging between mobile device 135 and central server 110.

FIG. 1 shows mobile device 135 communicating with central server 110, and central server 110 communicating with Active Resources & Actions Providers, Contents, Applications & Services Providers and Advertisers Servers 150. FIG. 1 also shows central server 110 communicating with responder client devices 150-152. Each of these communications may employ a direct connection, or one or more networks, or a combination thereof. For illustrative purposes, FIG. 1 does not show communication between central server 110 and Active Resources & Actions Providers, Contents, Applications & Services Providers and Advertisers Servers 150 employing network 120, however environments that include this communication may be employed with the present invention. In particular, central server 110 and Active Resources & Actions Providers and Contents, Applications & Services Providers and Advertisers Servers 150 may employ any one or more of direct communication, a local area network, or a wide area network, such as network 120.

A network enabling any one or more of the above communications may employ any from of computer readable media for communicating infatuation from one electronic device to another. Also, the network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between central server 110, Active Resources & Actions Providers and Contents, Applications & Services Providers and Advertisers Servers 150, responder client devices 150-152, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Responder clients 150-152 are computing devices that may be employed by a user, referred to as a responder, for receiving and responding to active note(s). A variety of responder client devices may be employed in accordance with the invention.

Responder client devices may include mobile devices, digital home clients such as personal computers and media centers, and other client devices. Generally, responder clients may include virtually any computing device, portable or non-portable, capable of receiving and sending a message over a network, such as network 120, or the like. Responder clients may include devices such as mobile device 151 (135) described herein. Though FIG. 1 illustrates only four responder clients 150-152, it is envisioned that the invention may be practiced in an environment that include a large community of responder clients. Thus, responder clients may number in the hundreds, thousands, hundreds of thousands, millions, or virtually any number.

Though FIG. 1 illustrates an embodiment of a system having each of network central server(s) 110 and Active Resources & Actions Providers, Contents, Applications & Services Providers and Advertisers server(s) 150 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

One embodiment of a network device that may be used to implement any one or more of central server 110 or Active Resources & Actions Providers, Contents, Applications & Services Providers and Advertisers Servers 150 is described in more detail below in conjunction with FIG. 3. Briefly, however, such network devices may include any computing device capable of communicating with other network devices to enable network applications or web sites to process and respond to requests from client devices, such as mobile device 135 is described in more detail below in conjunction with FIG. 2. Devices that may operate as these network devices include personal computers desktop computers, multiprocessor systems, microprocessor-based or programmable consumer electronics, network PCs, servers, and the like, or any combination thereof.

FIG. 1 illustrates an embodiment of a system having an ads server 150. Briefly, an advertisings server provides advertisements, such as banner advertisings, application advertisings or other types of advertisements. An application advertisement is an advertisement that is associated with an interaction with an application. It is typically integrated with the application presentation in some way. A search advertising is an example of an application advertisings. When a search is performed, a search application may select one or more ads based on the keywords of the search. The search application may combine search ads with the search results, and present them in an integrated manner. In some embodiments, the integration may be so complete that there is not a clear distinction between the search ads and the search results. In some embodiments, one or more ways of indicating the search ads may be included, such as text, color, line separators, and the like. Similarly, other applications may generate application ads. A mapping application, for example, may use the location specification in a request to generate advertisements based on the location, such as those of businesses in the area, and may display an advertisement on the map.

A banner advertisement typically is placed in a location that is separate from, or more distinguishable from, an application's results. For example, it may be at the top or bottom of a page, or along the margin. A banner advertisement may be selected based on criteria similar to those for an application ad, based on different criteria, or randomly selected Ads server 150 may have an associated ads database, which may be integrated or in communication with ads server 150. An ads database may store data pertaining to advertisement contents, constraints, and rules pertaining to the use of each advertisement. At least a portion of the data stored in ads server 150 may be specified by an advertiser. An advertiser may specify data describing the advertisement contents, constraints, and rules pertaining to the use of each advertisement.

Ads server 150 may receive data or a set of parameters to use for determining whether to provide an advertisement, selecting and generating an advertisement, including data upon which various determinations are made. Selecting and generating an advertisement may include selecting an advertiser, selecting an advertisement associated with the advertiser, or selecting content to include in an advertisement. The data upon which these and other determinations may be based may include information derived from a active note(s) received by the central server, one or more responses or active resources & actions received from a responder or active resources & actions provider(s) device, an aggregated response, and the like. The data upon which these and other determinations may be based may also include information about the user or mobile device, actions that the user or mobile device have taken, data pertaining to one or more advertisers, relevant events, and a variety of other types of information.

FIG. 1 illustrates an embodiment in which mobile device 135 communicates with central server 110. A user of mobile device 135, referred to as an "active note(s) provider," may employ mobile device 135 to send an active note(s) to central server 110. Central server 110 may receive and process the active note(s) from mobile device 135. Central server 110 may select a set of responders or responder devices 150-152. A responder is a person who employs a responder device to receive active note(s) and respond to them. Central server 110 may employ identifiers or addresses of responders, responder devices, or both. It may, for example, employ a login name or email address of a responder. It may employ an IP address, MIN, or other identifier of a responding device. Central server 110 may employ any one or more of these identifiers or addressing mechanisms when communicating with a responder or responding device. As used herein, unless the context clearly indicates otherwise, the term "responder" may be used to refer to a person, a responder device, or a combination of a person and a responder device.

Illustrative Client Device

Figure 2:
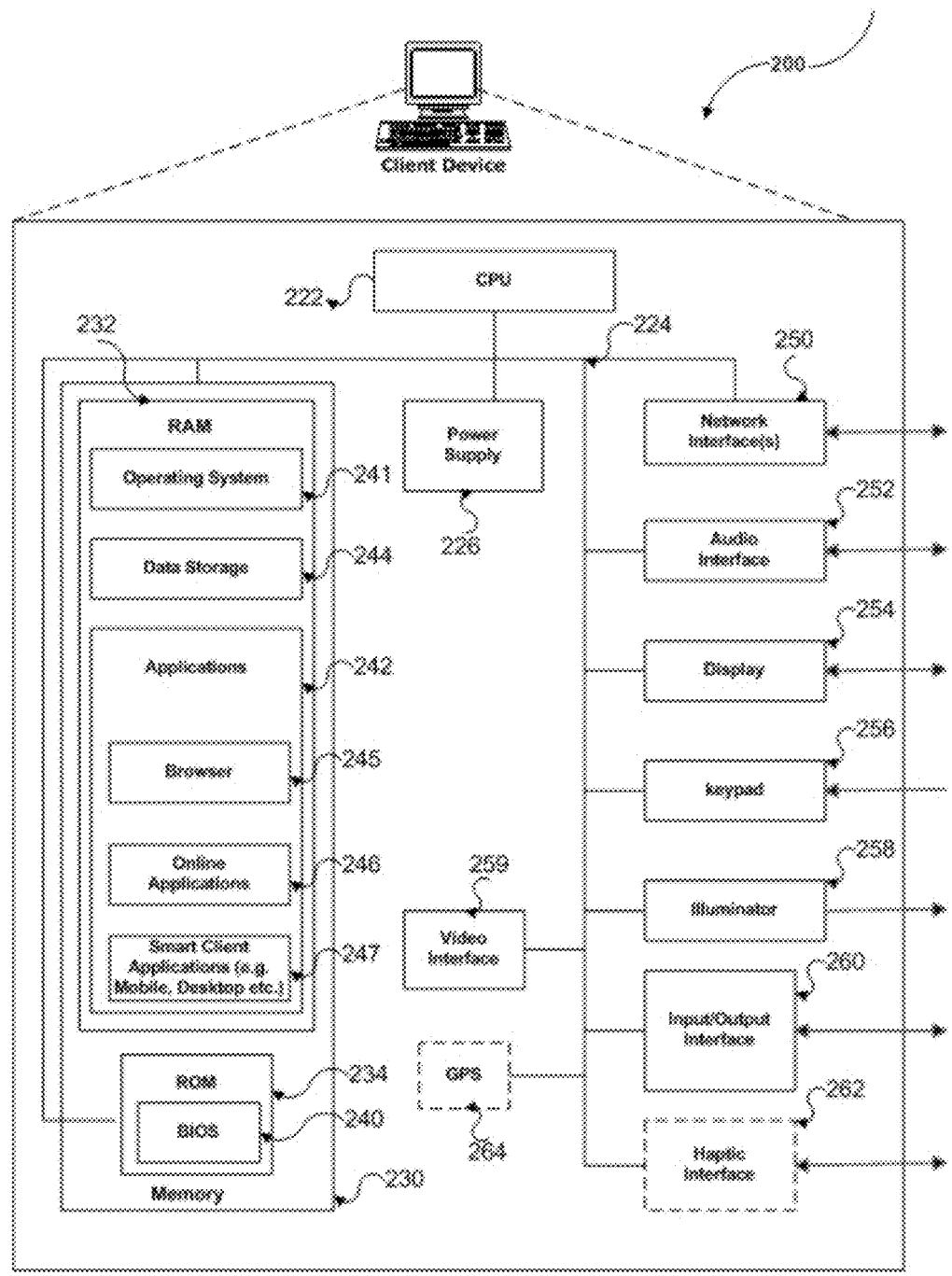
FIG. 2 shows one embodiment of a client device that may be employed in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention.

Client device 200 may represent, for example, user client devices 150 to 152 and responder client device 135 and 125 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the optional haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® Operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store multimedia information and/or content for later publication, editing, or the like, as well as other information including address lists, contact lists, personal preferences, or the like. At least a portion of the content may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), content, and enable telecommunication with another user of another client device. Other examples of application programs include calendars, editors, email clients, IM applications, SMS applications, VOIP applications, contact managers, task managers, transcoders, database programs, word processing programs, security applications, spreadsheet programs, games, search programs, and so forth. Applications 242 may further include browser 245. Browser 245 may include virtually any of a variety of client applications configured to receive and/or provide communications of web pages, and other content over a network. Browser 245 typically provides for a graphical display of various web pages, including user interfaces provided, in part, by another computing device over the network. Browser 245 may include a variety of security features, and/or other plug-in applications, modules, applets, scripts, or the like, to enable display of animation, videos, playing of audio files, or the like. Browser 245 and applications 242 are configured to enable a user or active note(s) provider(s) and active resources & actions provider(s) to communicating with or prepare content for sending to central server 110 of FIG. 1. Moreover, through one or more of applications 242, the user or active note(s) provider(s) and active resources & actions provider(s) may receive content or messages or active note(s) or active resources & actions or notifications.

Illustrative Network Device Environment

Figure 3:
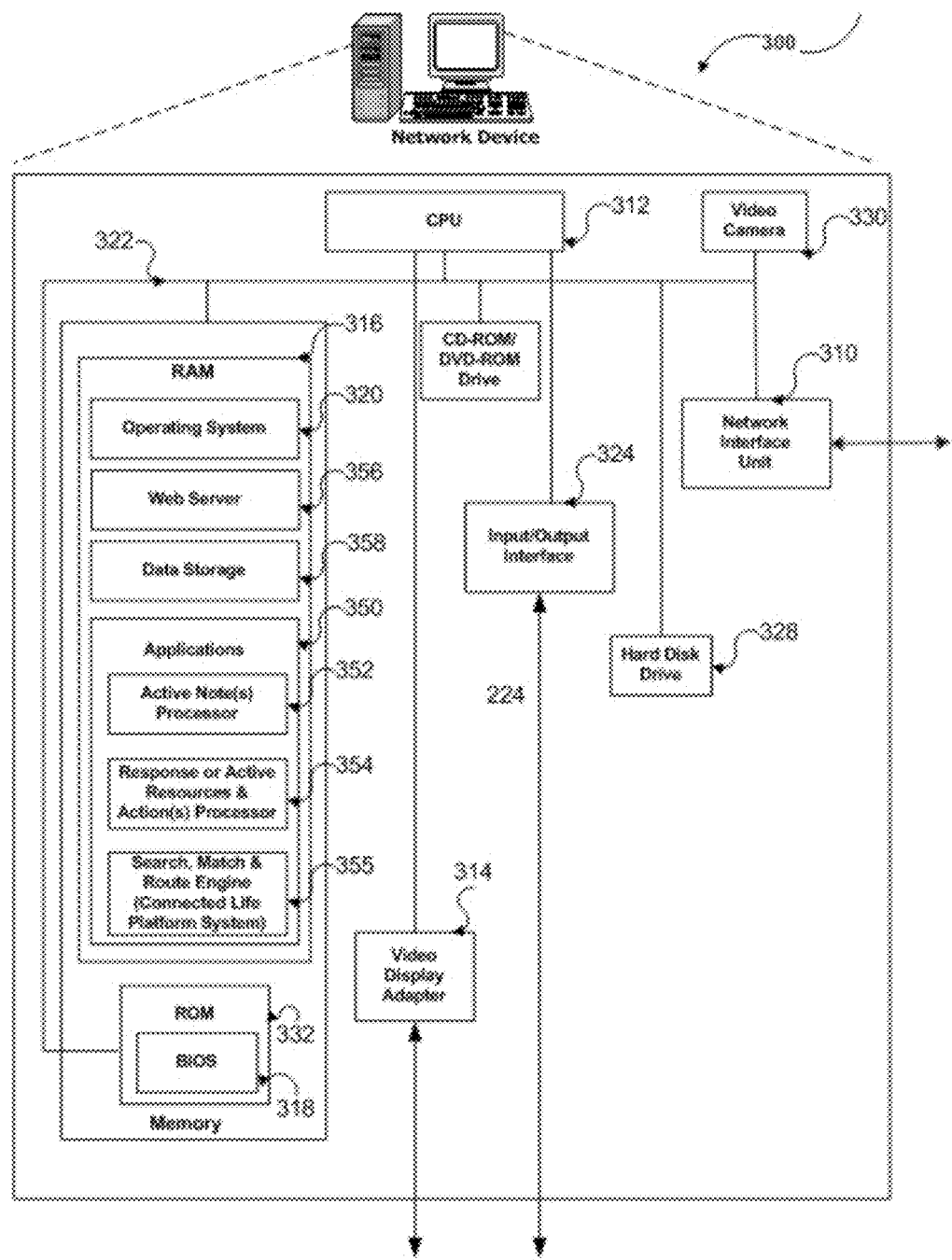
FIG. 3 shows one embodiment of a network device that may be employed in a system implementing the invention.
Figure 4:
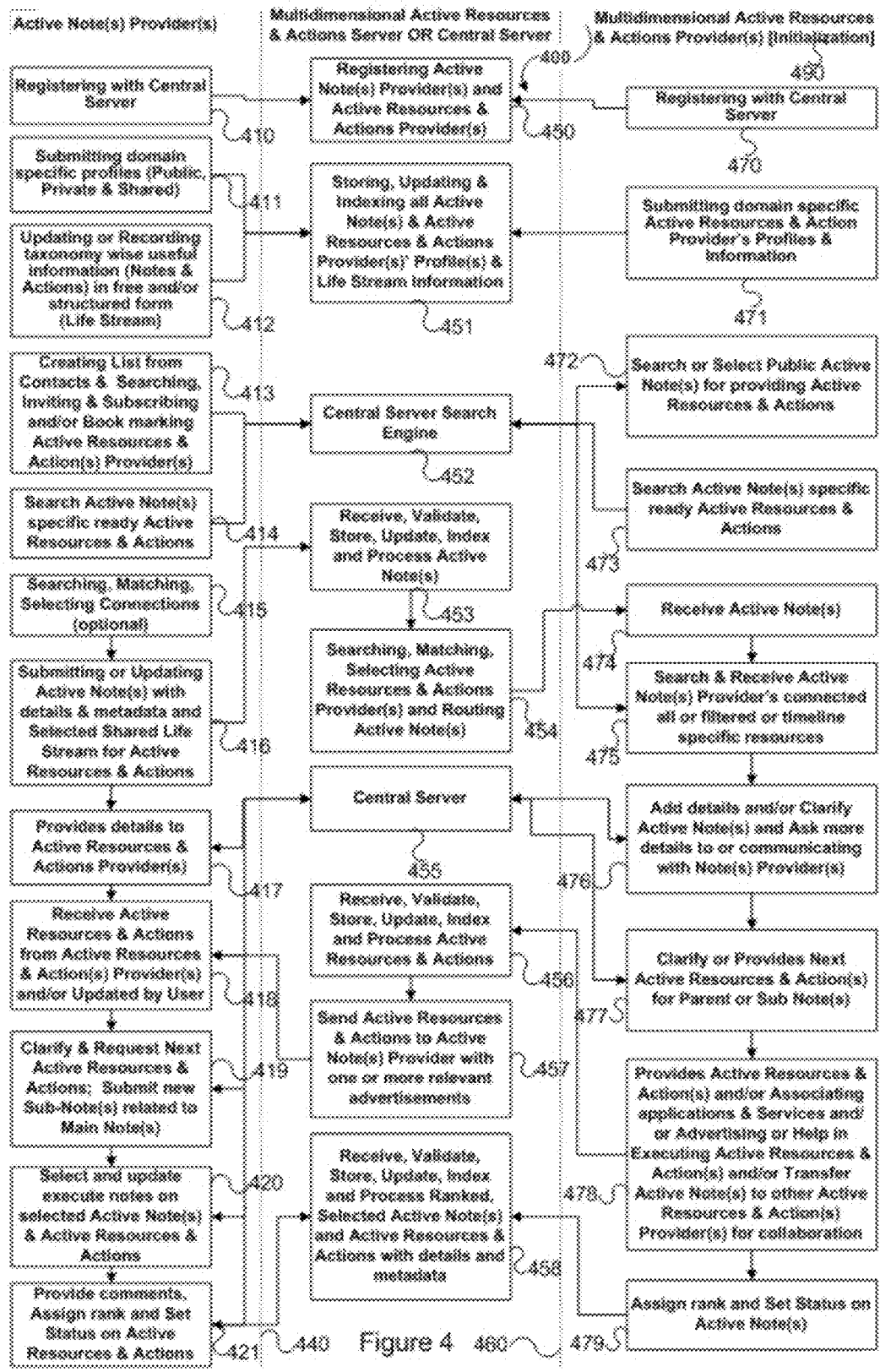
FIG. 4 is a logical flow diagram generally showing one embodiment of a process for providing active resources & actions by active resources & actions provider(s) to user or active note(s) provider(s) based on active note(s)
Figure 5:
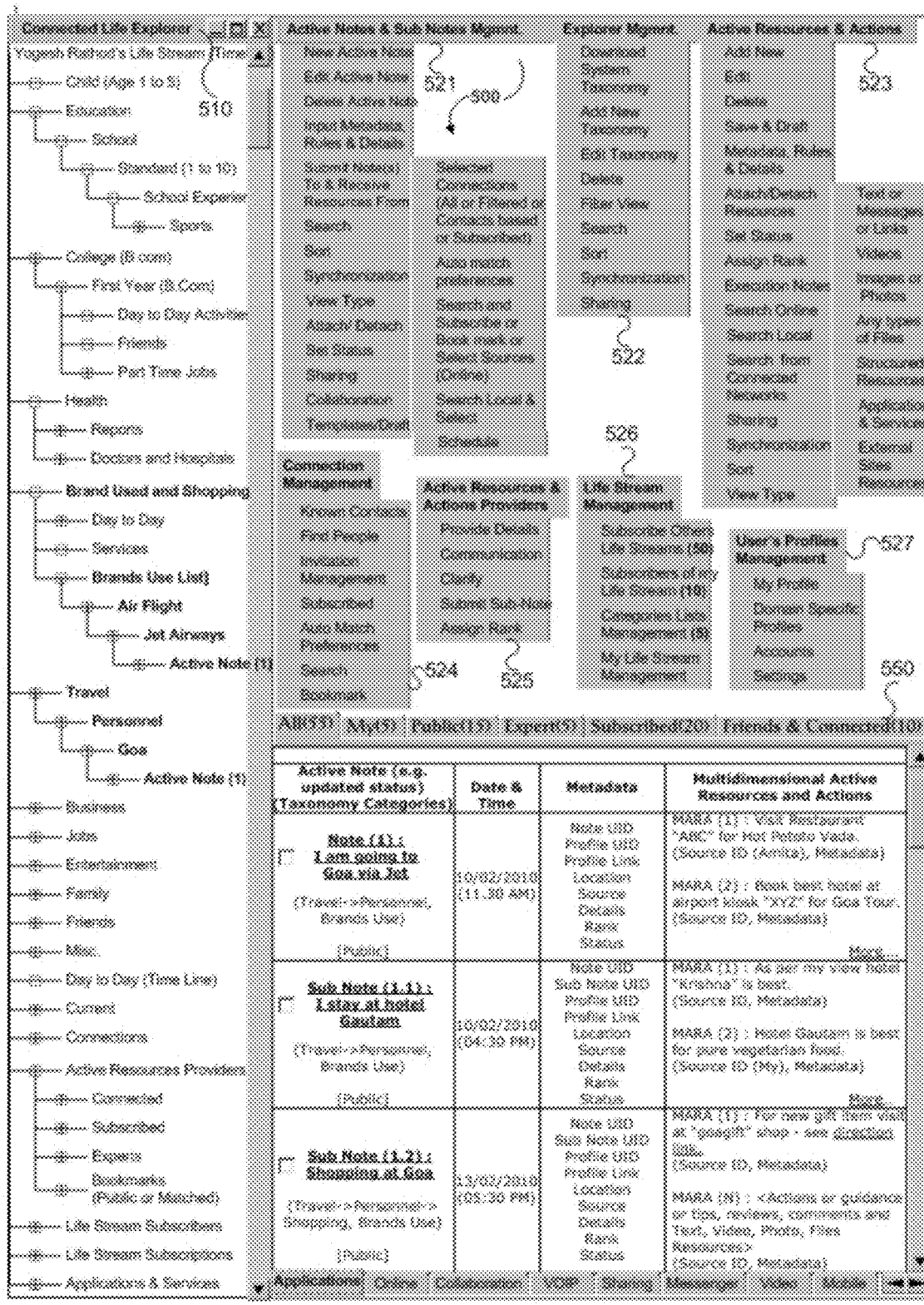
FIG. 5 illustrates example of graphical user interface (GUI) for Active Note(s) Provider(s)
Figure 6:
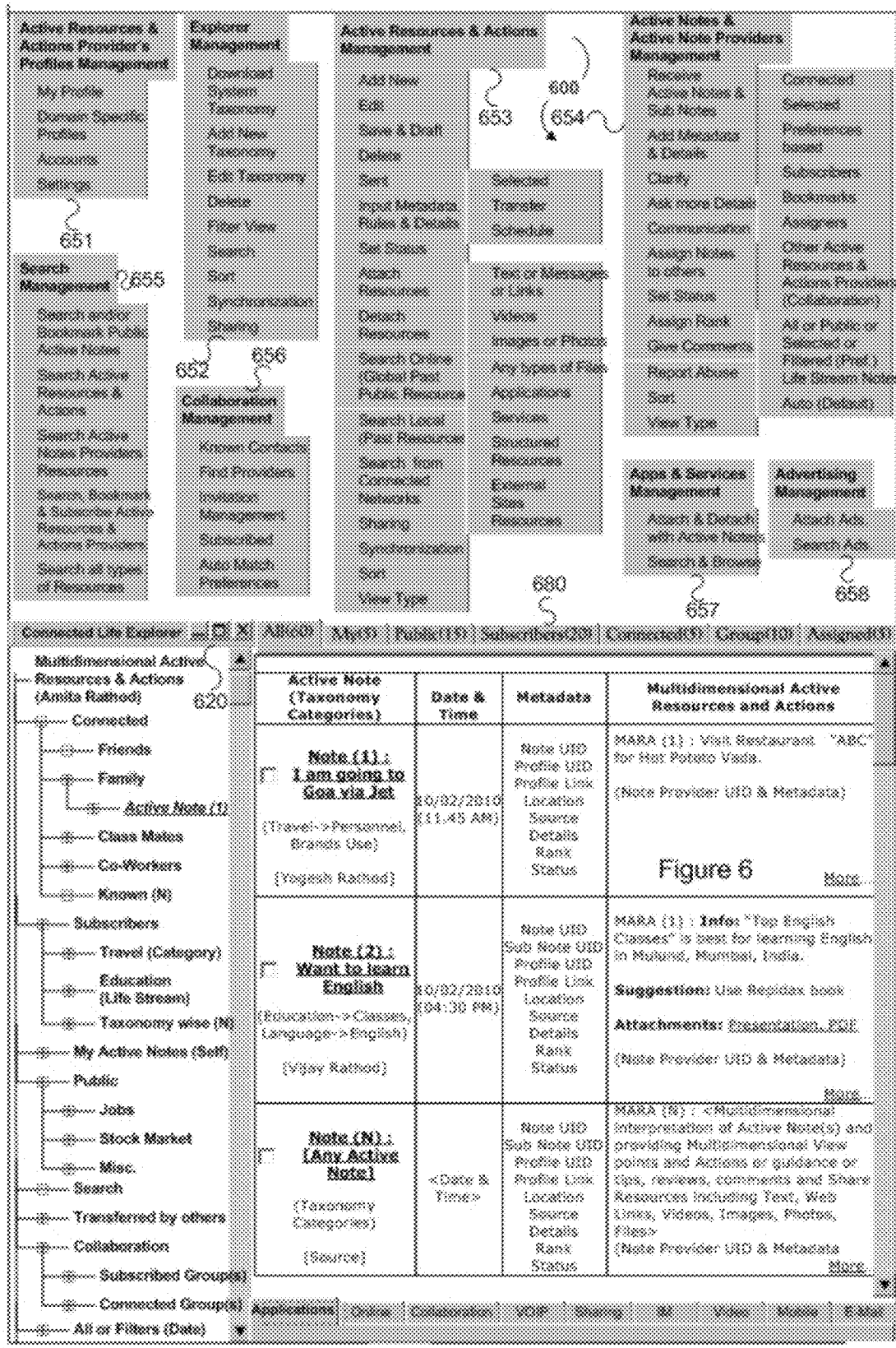
FIG. 6 illustrates example of graphical user interface (GUI) for Active Resources & Action(s) Providers.

FIG. 3 shows one embodiment of a network device 300, according to one embodiment of the invention. The embodiment of network device 300 illustrated in FIG. 3 may be used to implement the multidimensional active resources & actions central server 110 or the ads server 150 of FIG. 1. Network device 300 may include many more components than those shown. It may also have less than all of those shown. The components shown, however, are sufficient to disclose an illustrative embodiment for practicing the invention. One or more network devices, and the application programs integrated with the devices, may be used to implement the processes of the present invention, as illustrated in FIGS. 4-6 and discussed herein.

In any event, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account managers, and so forth. More detailed discussions of some application programs are included herein.

Mass memory further includes web server 356, data stores 358, and applications 350. Applications 350 are shown to include Active Note(s) Processor 352 and Active Resources & Action(s) Processor 354 and Search, Match & Route Engine, Applications & Services server (Connected Life Platform System) 355. Web server 356 includes virtually any application configured to delivers Web pages and other content to browsers and other client applications via at least the HTTP protocol. However, web server 356 may also be configured to provide scripts, user interfaces, accounting interfaces, editors, security, or the like, to the client application. Moreover, web server 356 may employ a variety of other communication protocols, beyond HTTP. For example, web server 356 may be configured to manage email communication protocols, SMS protocols, IM protocols, or the like. Moreover web server 356 may employ a variety of scripts, applets, programs, or the like, to enable communications of content with a client application.

Data stores 358 may include any of a variety of storage mechanisms, configured to store, and otherwise managed content, applications, scripts, applets, or the like. As such, data stores 358 may be a database, a file structure, or the like. Data stores 358 may store the content into a category structure, such as folders, albums, graphs, trees, or the like, based on a user account, a web service, or the like. In one embodiment, data stores 358 may represent the Data Management services illustrated in FIG. 1, and described in more detail below in conjunction with FIG. 4.

Connected Life Platform 355 is described in more detail below in conjunction with FIG. 4. Briefly, however, Connected Life Platform 352 includes a variety of components to provide web services to a user, including search tools, user interfaces, plug-and-play modules, or the like. Various embodiments of example user interface screens are described in more detail below.

In one embodiment, applications 352 may include an active note(s) processor 354. An active note(s) processor may include program logic that performs actions in response to receiving an active note(s) from active note(s) provider(s) client device. These actions may include determining a set of responders to solicit responses from, sending an active note(s) to the set of responders, or other actions relating to processing active note(s).

In one embodiment, applications 354 may include a response or Active Resources & Action(s) processor 356. A response or Active Resources & Action(s) processor may include program logic that performs actions relating to receiving and processing responses or active resources & action(s). These actions may include receiving and collecting responses or active resources & action(s), associating advertising, applying validation, spam control, limits & settings, preparing a response to be sent to the active note(s) provider(s), or other actions relating to processing responses. These actions are discussed in further detail herein. Though FIG. 3 illustrates an active note(s) processor and a response processor, the actions and logic of each component may be combined into a single component, divided into multiple components in a different manner, or distributed in a variety of ways across multiple network devices.

Generalized Operation

FIG. 4 is a high-level flow diagram of a process 400 for processing and responding to one or more active note(s) in accordance with an embodiment of the invention. Process 400 may employ at least a portion of the system illustrated in FIG. 1. It may employ any of the system variations as discussed herein, or it may be performed with other systems.

FIG. 4 is divided into three areas by two vertical dotted lines 440 and 460. The area to the left of line 440 is labeled as the Active Note(s) Provider(s) area; the area between lines 440 and 460 is the central server area; and the area to the right of line 460 is the responder or Multidimensional Active Resources & Actions Provider(s) area. Each of the action blocks of FIG. 4 resides within one of the three areas. The areas illustrate, for one embodiment, a component corresponding to each action that may perform the action. The invention is not so limited, however. In various embodiments, each of the actions may be performed by a component other than that illustrated in FIG. 4. Unless clearly limited otherwise herein, any one or more of the actions may be performed by one or more of the components, or by components other than the active note(s) provider(s), the central server, or a responder.

As illustrated in FIG. 4, at block 410, a user or note(s) provider(s) and at block 470, a Multidimensional Active Resource(s) & Action(s) Provider(s) may initially register for use of the central server i.e. Connected Life Platform. In one embodiment, one username/password can be provided to a user or a note(s) provider(s) and a Multidimensional Active Resource(s) & Action(s) Provider(s) to allow access to all website properties of the central server i.e. Connected Life Platform including online or mobile website(s) or portal or smart desktop or mobile clients or other applications or services or devices or $3^{rd}$ parties' applications & services integration. In one embodiment, username and email addresses can be used as unique identifiers including trusted identifications like official e-mail id or mobile phone number or any other trusted id system for each registration. Moreover, a user or a note(s) provider(s) and a Multidimensional Active Resource(s) & Action(s) Provider(s) may perform multiple concurrent logins to the central server or Multidimensional Active Resources & Actions Server (Connected Life Server) System or Platform.

In one embodiment, a root level webpage for website can have a prominent button or link called "Log in or Register." This link can be pervasive through all screens on the websites. Clicking on this button can generate the login screen, which can have a link or button to "Create a New Account". Clicking on this button, in one embodiment, produces the Registration Page. In one embodiment, if a user or a note(s) provider(s) and a Multidimensional Active Resource(s) & Action(s) Provider(s) has not logged in and they attempt to submit an active note(s) or sent Multidimensional Active Resources & Actions to other users (for example, by clicking on "Active Note(s) Management" or "Multidimensional Active Resources & Actions Management" or the like.) the Login Page can appear. Logout links may take place of "Login" links after the user or a note(s) provider(s) and a Multidimensional Active Resource(s) & Action(s) Provider(s) has successfully logged in. After clicking on logout, the user may be taken to the one of the website's Home Page. In one embodiment, the user's browser can prompt the user whether it wants to remember the username/password for the next visit.

In one embodiment of a registration interface if a required field is left empty in the quick registration interface, or if the password fields do not match, the fields that are to be fixed may be indicated in some manner, e.g., red text, entry area highlighted, or the like. Users may choose to view the Terms of Use and Privacy Policy before proceeding, in one embodiment. If the user clicks on either of these links, a new daughter window can appear with a "Close" button at the bottom of the text. Moreover, users can be told that their registration request failed if the birth date that they enter makes them less than some defined age, after they click on "Continue."

Thus, in one embodiment, after clicking on "Continue" on a previous page, an email is sent to the user's registered email account. Screen may then be displayed in the browser. All fields shown in screen may be optional. Clicking "Save" at bottom of a form generates an alert message interposed on the "Home Screen" for the site, telling the user to check their email for the confirmation message so they can log in.

If the user is not logged in after launching the confirmation page, then their first login can take place on their first attempt to submit active note(s) or receive user's active note(s) or sent Multidimensional Active Resources & Actions, whether it is a create new active note(s) or new Multidimensional Active Resources & Actions or an update to their profile. Moreover, the Multidimensional Active Resources & Actions Server provides for situations, where the user may have forgotten their password. Thus, a "Forgot Password?" link can appear next to the password entry field for login. Clicking on this link can produce a field requesting username OR email address they registered with and a submit button. Providing registered email address and clicking on "Submit" can cause the user's password to be sent to their registered email account.

Typically, collection of statistics begins for the registered user immediately upon completion of registration. All ratings, comments, publications submissions, or the like, may be traceable/displayable back to the user, as well as all revenue-generating activity related to the user (page views, click-through, or the like). In one embodiment, a mechanism for bulk importing a set of user registrations from an acquired company or other sources or partners may be provided. The process can flag duplicate usernames and can allow for the acquired user to change their username to something unique to preserve their account history. Moreover, in one embodiment, logging subsystems of the system may track abandoned registrations. User can also browse and search categories active notes and related Multidimensional Active Resources & Actions and resources and people or user or active note(s) providers or Multidimensional Active Resources & Actions provider(s) from home page (central server search engine).

As illustrated in FIG. 4, at block 411, a user or a note(s) provider(s) and at block 471, a Multidimensional Active Resource(s) & Action(s) Provider(s) may submit or update domain or subject specific one or more structured or free form profile(s) to the central server or Multidimensional Active Resources & Actions Server which are useful for understanding a user or a active note(s) provider(s) & active note(s) for providing Multidimensional Active Resources & Actions and relevant matching of active note(s) related Multidimensional Active Resources & Actions Provider(s).

As illustrated in FIG. 4, at block 412, a user or a note(s) provider(s) can update user's life stream related active note(s) and related ranked or executed Multidimensional Active Resources & Actions with metadata including date & time, sources, links, categories, taxonomies, keywords, rank, comments, status in structured or semi structured or free form to the central server or Multidimensional Active Resources & Actions server. Central server stores, updates, indexes all said resources and makes them searchable for other users or notes providers and Multidimensional Active Resources & Actions Providers.

As illustrated in FIG. 4, at block 413, a user or a note(s) provider(s) can create or update connections based on known contacts, find people, inviting known and/or unknown like-minded users from present network or from other one or more external network(s), subscribing sources, search and bookmark matched sources or setting preferences for auto matching of provider(s) by central server for receiving Multidimensional Active Resources & Actions from Multidimensional Active Resources & Actions providers. Central server stores user's all types of connections and preferences for selecting, matching and routing a user or active note(s) provider(s) one or more active note(s) to one or more Multidimensional Active Resource(s) & Action(s) Provider(s) for Multidimensional Active Resource(s) & Action(s).

As illustrated in FIG. 4, at block 413, a user or a note(s) provider(s) can search, match and receive active note(s) specific ready ranked Multidimensional Active Resource(s) & Action(s) from central server Multidimensional Active Resource(s) & Action(s) Search Engine.

As illustrated in FIG. 4, at block 490, an initialization action is performed. In one embodiment, this action is performed by a responder and a central server in communication with each other. The initialization action of block 490 may include any one or more of the following actions:
a responder registering as a member or a responder;
a responder logging in;
specification of content for active note(s) that the responder may respond to;
specification of other criteria to use for determining whether to solicit a response from the responder; or
specification of data for identifying or locating the responder, type or capabilities of the responder's client device, and the like.

Specification of content may include various levels of specificity. It may include geographic specifications, level of expertise, or other data that may assist a matching of an active note(s) with a set of responders. A responder may specify one or more areas of expertise.

Specification of other criteria may include criteria that may throttle, or otherwise limit the solicitation from the responder. This may include a desired limit to the frequency of active note(s); a desired time period between active note(s), times when active note(s) may be submitted or not submitted, or other such data. The action of block 490 may be performed by numerous responders. Responders may number in the thousands, millions, or virtually any other number.

At block 416, an active note(s) provider(s) may post an active note(s). Posting an active note(s) may include specifying an active note to be responding by Multidimensional Active Resources & Actions provider(s) and sending the active note(s) to the central server or Multidimensional Active Resources & Actions server. Before sending user can at block 415 select one or more destination or Multidimensional Active Resource(s) & Action(s) Provider(s) or sent to subscribed or directly sent to the central server for auto match making based on preferences and/or profile(s) and/or past active note(s) and/or other historical resources. An active note(s) may be specified in one or more of a number of ways. In one embodiment, an active note(s) is specified by entering text. As used herein, the term an active note refers to a specification of a matter that elicits a reply. It may take the form of an interrogatory, a statement, or a single word or phrase that represents a request for a response. Some examples of n active note(s) include: "I m going to Goa", "Today I m attending party", "Want to purchase a mobile." An active note(s) can be in the form of text, video, graphics, photo, picture, an image, an audio segment, a document, or other forms, or any combination thereof.

Process flow then proceeds to block 453, where the posted active note(s) is received and processed. In one embodiment, this action is performed by a central server. This action is illustrated in further detail in FIGS. 8 and 9, and the accompanying text. Briefly, processing an active note(s) includes preparing the active note(s) for transmitting to responders, determining a set of target responders, sending the active note(s) to the target responders, and initiating a timing operation. Processing an active note(s) may include adding supplementary information, details and metadata to the active note(s). As used herein, the term active note(s) may include supplementary information, details and metadata that are sent to a responder.

Process may then flow to block 474, where at least a portion of the target responders receive the processed active note(s). As discussed in the text accompanying FIGS. 8 and 9, the active note(s) may be transmitted to responders using any of a number of transmission mechanisms, including instant messaging (IM), SMS, or other communication mechanism. Responders may receive the active note(s) in an IM window, a browser window, an SMS window, and the like. An active note(s), including any supplementary information, details and metadata may be transmitted using more than one media or communication mechanism. For example, an IM message may include a link to a web page or audio segment containing a part of the active note(s).

Process may then flow to block 475, where Multidimensional Active Resource(s) & Action(s) Provider(s) may search Active Note(s) Provider's connected all or filtered or timeline specific resources for understanding active note(s) and active note(s) provider(s) in multiple ways and providing Multidimensional Active Resource(s) & Action(s) to active note(s) provider(s).

Process may then flow to block 476, where Multidimensional Active Resource(s) & Action(s) Provider(s) may add details to said active note(s) and/or clarifies active note(s) by communicating with active note(s) provider(s) and at block 417, a user or active note(s) provider(s) provides additional details or clarify the said active note(s) and/or establish communication with said Multidimensional Active Resource(s) & Action(s) providers.

Process may then flow to block 478, where one or more of the responders or Multidimensional Active Resource(s) & Action(s) Provider(s) may provide a response to the active note(s). This action may include a responder specifying a response and transmitting the selected response to a server such as the central server. The format of a response may vary, and may depend on the form of the active note(s). A response may include free text, an image, video, audio or voice, files, documents, web link, any types of contents, a link, applications, services, or another form, or any combination thereof. The responder or Multidimensional Active Resource(s) & Action(s) Provider(s) can assigned or transfer said active note(s) to other matched or subscribed or known or connected or public or groups or collaborate with other Multidimensional Active Resource(s) & Action(s) Provider(s) for providing Multidimensional Active Resource(s) & Action(s) to said active note(s) providers for said active note(s).

A response may be transmitted by a responder using the same or different communication mechanism as the one in which the active note(s) was received by the responder. The responder may transmit a response using IM, SMS, or other communication mechanism.

Process may then flow to block 456, where responses sent from responders are received and processed. Responses may be aggregated, and an aggregated and processed response may be sent to the Active Note(s) Provider(s). In one embodiment, at least some of these actions are performed by a central server. This may be the same or a different central server as the central server that performed the actions of block 453. The actions of block 456 are illustrated in further detail in FIGS. 8 and 9, and the accompanying text.

Process may then flow to block 418, where a processed response is received by the Active Note(s) Provider(s). A processed response may be presented to the Active Note(s) Provider(s) in a variety of forms.

A processed response received by an Active Note(s) Provider(s) may include one or more message(s), web links, text, video, audio or voice, images, photos, videos, files or documents or other types of information relating to the response. This information may be displayed on the Active Note(s) Provider(s)'s client device in any of a number of ways. In one embodiment, a response received by an Active Note(s) Provider(s) may include a sponsor advertisement. The advertisement may be selected by the central server, by another server, or another source.

Process may then flow to block 421, where the Active Note(s) Provider(s) may select, from the response, a Multidimensional Active Resource(s) & Action(s) item that the Active Note(s) Provider(s) considers to be the best or most desirable response. The active note(s) provider's selection may then be sent to a central server for additional processing. This server may be the Multidimensional Active Resources & Actions server that performed the actions of block 356, another Multidimensional Active Resources & Actions server, or another server. Sending the selected Multidimensional Active Resources & Actions item may be performed using the same or a different communication mechanism as was used to send the processed response to the active note(s) provider.

Process may then flow to block 458, where the selection of the best Multidimensional Active Resources & Actions item or other data may be stored or transmitted to another network device for processing or storage. Data that may be stored or transmitted may include the original active note(s), a processed active note(s), identification of the Active Note(s) Provider(s), responder responses or Multidimensional Active Resources & Actions, identification of responders or Multidimensional Active Resources & Actions Provider(s), an association between each responder or Multidimensional Active Resources & Actions Provider(s) and the response or Multidimensional Active Resources & Actions received from the responder or Multidimensional Active Resources & Actions Provider(s), the processed response or Multidimensional Active Resource(s) & Action(s), the number or percentage of responders or Multidimensional Active Resources & Actions provider(s) providing each Multidimensional Active Resource(s) & Action(s) item, the selected best Multidimensional Active Resource(s) & Action(s) item, additional information or details and metadata relating to the active note(s) or Multidimensional Active Resource(s) & Action(s) that may have been sent to the responders or to the active note(s) provider(s) or user, other related data, or any combination of these. In one embodiment, at least some of the stored data may be stored so that it is available for use in processing subsequent active note(s) or responses or Multidimensional Active Resources & Actions. For example, if a substantially identical active note(s) is asked a second time within a predetermined time period, a central server or Multidimensional Active Resources & Actions server may reply to the active note(s) provider(s) or user based on the prior active note(s) and Multidimensional Active Resource(s) & Action(s). It may forego at least some of the actions of sending the active note(s) to the responders or Multidimensional Active Resources & Actions Provider(s) and receiving responses or Multidimensional Active Resources & Actions. In another example, at least some of the processing that is performed at block 353 or 356 may be used to process a subsequent active note(s) or responses i.e. Multidimensional Active Resources & Actions. In one embodiment responses i.e. Multidimensional Active Resources & Actions may be provided to sponsors or other entities that have an interest in the subject matter.

In one embodiment, an active note(s), a Multidimensional Active Resource(s) & Action(s), percentages of responders providing a Multidimensional Active Resources & Actions item, or other saved data may be presented on a web site in a variety of ways. Responses or associated data about products or services may be presented on a web site that reviews, discusses, or provides information about products or services.

The methods and mechanisms of the invention, discussed herein, facilitate a synchronous or a substantially synchronous active note(s) and related multidimensional active resources & actions session for a client device. That is, a user may submit an active note(s) and receive a very prompt response or multidimensional active resources & actions in a single session. This may be referred to as a real time communication, or a real time session. The user is not required to return to a web page or client program, or log in, at a later time. A user of a mobile device may have the expectation of receiving a prompt "while-you-waif" multidimensional active resources & actions to facilitate choices, such as a buying decision while in a store, a restaurant or movie decision while near a potential restaurant or theater, and the like.

Many of these actions are described below in conjunction with FIGS. 5-6.

FIGS. 5 and 6 show different screen shots style drawings of various embodiments of user interfaces for employing the present invention i.e. Connected Life Platform, in accordance with the invention. It should be noted that the following illustrations are not intended to limit the invention. Instead, they are intended to merely provide an overview non-exhaustive understanding of how the invention may be employed.

In one embodiment, a user may interact with the Connected Life Platform using virtually any browser application or smart client or smart online applications, including, but not limited to Internet Explorer (IE), Firefox, Opera, Safari, or the like. Moreover, as described above in conjunction with FIGS. 1 and 2, the user may use any of a variety of client devices.

FIG. 5 illustrates one embodiment of a screen 500 configured as a possible home screen of Central Server's (Connected Life Server's) registered User or Active Note(s) Provider(s) managed by the platform. Screen 500 enables users to obtain an at-a-glance view into the parts of their presence on the site; and obtain a convenient means of managing Profile(s), Privacy and Account Settings, Active Note(s), Multidimensional Active Resources & Actions and Providers, Friends, Connections, Contents, Explorer Life Stream, Subscriptions and Subscribers, Applications and Services 521 to 527 and All Statistics including User's Ranks, Levels, Points and all types of Statistics. Explorer interface provide all types of functionalities comprising viewing complete or partial or filtered or categories or taxonomies wise life stream of active note(s) provider's or user's or any entities including any individual, group(s) of individuals, connected individuals, company, manufacturers, service providers, organization, government department(s), institute, shop, society, friends, family, social connections, like minded individuals, similar activities or actions or work or professionals or location or language or income group or age or education or hobbies or qualification or any other match making or preferences specific individuals or persons or people, school, college, class, employers, employee, professionals, workers and like. Life stream covers all user or Active Note Provider or $3^{rd}$ parties Multidimensional Active Resources & Actions Provider(s)' recorded or updated all types of multidimensional resources including all important things (active note(s) in life and related Multidimensional Active Resources & Actions including all chronological updated information, experience, solution, execution steps & right directions, rank, comments, reviews, procedures, best way to do, features, blogs, text, messages, videos, audio, voice, photos, images, structured information including tags or categories specific contents like which are useful to users and understanding user's any active note(s) by Multidimensional Active Resources & Actions Provider(s) providers. Other users or active note(s) provider(s) can subscribe to one or more users' or active note(s) provider(s)' all or selected or taxonomies or categories specific or filtered or preference based or matched life stream with permission or public life stream without permission. Categories Life Stream List(s) facilitates user's to subscribe plurality of other users' life stream.

Explorer 510 & Explore Management 522 provides user friendly interface for navigating user's life stream in chronological or category or taxonomy wise, user can jump to any part of life stream, $3^{rd}$ click menu provides all functions or operations in single or in group mode like searching & viewing active note(s) related to particular date & time or category or location or name or keyword(s) or one or more search phrases with Boolean operators and sort the results as per date & time or category or source. User can share or synchronizing one or more selected life stream with other connected users including friends, family, co-workers, co-professionals, class mates, colleagues, likeminded unknown people and like from explorer. User can make any one or more active note(s) or parts or category of life stream public or private or shared and attach or define privacy policies and rule or conditions for security. User can also add new active note(s) and related multidimensional active resource(s) & action(s) or edit or modified or delete or associate metadata including one or more categories, taxonomies, keyword(s), notes, comments, ranks, status and like with one or more active note(s) or parts or category of life stream. User can download or updates system all or domain or subject or categories wise one or more parent taxonomies (one or more levels or depths of categories) from the central server. Standard or system or default taxonomies provides compatibility with all users' life stream for sharing, data mining, synchronizing, sorting, organizing, viewing, comparing, searching, matching, categorizing, aggregating, filtering and like. User can add new user created or generated taxonomies or import from any sources and append to one or more parent system taxonomies or modify or delete user generated or created child taxonomies later at any time.

When user clicks on any tree like list of explorer, associate lists of active note(s) displayed to user 550 for managing one or more active note(s) or sub note(s) or N depths of sub note(s) for viewing the active note(s) and related Multidimensional Active Resources & Actions and metadata, user can select one or more active note(s) for group actions including organizing, aggregating, categorizing, sharing, assign rank or give comments or reviews and like. User can view updated Multidimensional Active Resources & Actions for active or current or open active note(s) in categories like Multidimensional Active Resources & Actions from subscription sources, public or expert or connected Multidimensional Active Resources & Actions Providers. User can delete one or more active note(s) and resources or modify selected active note(s). User can also communicate with selected active note(s) related one or more Multidimensional Active Resources & Actions Provider(s).

By using menu "Active Notes & Sub Notes Management" 521 user or active note(s) provider(s) can add new, edit or delete existing active note(s), associate metadata and details, search, sort, synchronizing, share, view one or more or group(s) of active note(s). User can submit one or more active note(s) to one or more selected sources of Multidimensional Active Resources & Actions or Multidimensional Active Resources & Actions Providers including known like friends, family, class mates, co-workers, colleagues or subscriptions of providers or unknown like minded or two way preference based match making or broadcast or make active note(s) as public and sent instantly or schedule the submissions. User can use template(s) for creating active note(s) from local or other remote sources. After submission of one or more active note(s) to one or more Multidimensional Active Resources & Actions Providers, user can set status of one or more active note(s) like "Current", "Pending", "Sent", "Drafted", "Open", "Closed", "Like", "Important", "VIP" and like. User can also attach and/or detach one or more active note(s) with any or one or more part(s) or categories of life stream.

By using menu "Active Resources & Actions" 523, user or active note(s) provider(s) can self add new or edit or delete or draft one or more Active Resources & Actions and associate metadata including date & time, category, author, types of resources, rank, execution note, comments or reviews, set status and like, attach or detach one or more resources including text, message(s), link(s), video(s), audio, voice, files, images, photos, application(s), service(s), structures resource(s) and resources from current networks or from other networks of user's friends or connected users, search resources from local network, connected social networks, central server's Active Resources & Actions Search Engine, shared or subscribed or updated (via synchronization) resources from friends or other connected users with one or more Active Resources & Actions related to selected one or more active note(s) or active sub note(s). User can sort (date, time, source and category wise) or search or order or organize or select view types of Active Resources & Actions.

By using menu "Connection Management" 524, user can create contacts by find people, inviting friends and known people, search, subscribe or book mark like minded users, set two way auto matching preferences, subscribed one or more public or expert or known Multidimensional Active Resources & Actions Provider(s).

By using menu "Active Resources & Actions Providers" 525, user can communicate with selected one or more Multidimensional Active Resources & Actions Provider(s) for provide requested more details or clarify provided Multidimensional Active Resources & Actions by Provider(s). User can assign rank or comments on one or more selected Multidimensional Active Resources & Actions Provider(s). User can also again submit one or more sub note(s) or sub-sub note(s) up to N depths to one or more Multidimensional Active Resources & Actions Provider(s) related to one or more selected main or parent active note(s).

By using menu "Life Stream Management" 526, user can subscribe to other known or unknown or like minded users' selected life stream with permission and allow others to subscribe users' selected life stream with permission. User can also create one or more categories list(s) of other users' life stream and allow other users to subscribe said one or more categories list(s) of life stream or user also can subscribe other users' categories list(s) of life stream. User or any entity or administrator can also manage their own life stream(s) including categorizing life stream(s), make one or more life stream(s) public or private or shared, allow other user's to subscribe one or more selected life stream(s) for using ready resources or providing Multidimensional Active Resources & Actions. Connecting others or allow others to connect with user's all or selected one or more or filtered life stream(s).

By using menu "User's Profiles Management" 527, user can manage or create or update one or more domain or field specific profile(s) to the central server. Central server stores, updates, indexes all public, private and shared profile(s) of user and make them searchable for all or selected users for understanding user's active note(s) and user. User can manage accounts and apply settings for security and personalization and customization.

FIG. 6 illustrates one embodiment of a screen 600 configured as a possible home screen of Central Server's (Connected Life Server's) registered Multidimensional Active Resources & Actions Provider(s) managed by the platform. Screen 600 enables Multidimensional Active Resources & Actions Provider(s) to obtain an at-a-glance view into the parts of their presence on the site; and obtain a convenient means of managing Profile(s), Privacy and Account Settings, Active Note(s) related Multidimensional Active Resources & Actions management, Other Multidimensional Active Resources & Actions Providers for collaboration, Friends, Contents, Explorer, Subscriptions and Subscribers, Applications & Services, Search Management 651 to 655 and All Statistics including Multidimensional Active Resources & Actions Provider(s)'s Ranks, Levels, Points and all types of Statistics. Explorer interface provide all types of functionalities comprising all active note(s) from all sources including one or more active note(s) from connected sources like friends, family, class mates, co-workers, colleagues and any connected & known people, category specific subscribers, public active note(s) and active note(s) provides(s), bookmarked active note(s) by Multidimensional Active Resources & Actions Provider and active notes from other Multidimensional Active Resources & Actions. Providers for collaborative providing Multidimensional Active Resources & Actions to active note(s) provider(s) or transferred or assigned active note(s) for Multidimensional Active Resources & Actions. Multidimensional Active Resources & Actions Provider(s) includes any individual or entities including any individual or person or people, group(s) of individuals, connected individuals, company, manufacturers, service providers, organization, government department(s), institute, shop, society, friends, family, social connections, like minded individuals, similar activities or actions or work or professionals or location or language or income group or age or education or hobbies or qualification or any other match making or preferences specific individuals or persons or people, school, college, class, employers, employee, professionals, workers and like. Multidimensional Active Resources & Actions including all important things related to any types of active note(s) in user's life, all chronological updated information, experience, solution, execution steps & right directions, rank, comments, reviews, procedures, best way to do, features, blogs, text, messages, videos, audio, voice, photos, images, structured information including tags or categories specific contents like.

Explorer 620 & Explore Management 652 provides user friendly interface for navigating all active note(s) received or updated or downloaded or synchronized from all sources including connected or known, subscribed, public source via search & book mark, auto matched sources based on two way preferences in chronological or category or taxonomy wise, Multidimensional Active Resources & Actions Provider(s) can jump to any part of explorer, $3^{rd}$ click menu provides all functions or operations in single or in group mode like searching & viewing active note(s) related to particular date & time or category or location or user name or keyword(s) or one or more search phrases with Boolean operators and sort the results as per date & time or category or source. Multidimensional Active Resources & Actions Provider(s) can share or synchronizing or transferred or assigned one or more selected active note(s) with other connected Multidimensional Active Resources & Actions Provider(s) including groups, subscribed, connected or known like friends, family, co-workers, co-professionals, class mates, colleagues, likeminded unknown people and like from explorer. Multidimensional Active Resources & Actions Provider(s) can select any or more node of tree related to particular source or category of active note(s) provider(s) for providing Multidimensional Active Resources & Actions (add new or edit or modified or delete or associate metadata including one or more categories, taxonomies, keyword(s), notes, comments, ranks, status and like with one or more multidimensional active resource(s) & action(s) related to one or more active note(s). Multidimensional Active Resources & Actions Provider(s) can download or updates system all or domain or subject or categories wise one or more parent taxonomies (one or more levels or depths of categories) from the central server. Standard or system or default taxonomies provides compatibility with all users' life stream for sharing, data mining, synchronizing, sorting, organizing, viewing, comparing, searching, matching, categorizing, aggregating, filtering and like. Multidimensional Active Resources & Actions Provider(s) can add new user created or generated taxonomies or import from any sources and append to one or more parent system taxonomies or modify or delete user generated or created child taxonomies later at any time.

When Multidimensional Active Resources & Actions Provider(s) clicks on any tree like list of explorer, associate lists of active note(s) displayed to user 680 for managing one or more active note(s) or sub note(s) or N depths of sub note(s) for viewing the active note(s) and related Multidimensional Active Resources & Actions and metadata, Multidimensional Active Resources & Actions Provider(s) can select one or more active note(s) and Multidimensional Active Resources & Actions for group actions including organizing, aggregating, categorizing, sharing, assign rank or give comments or reviews and like. Multidimensional Active Resources & Actions Provider(s) can view updated active note(s) in categories like active note(s) from connected or known users or active notes providers or subscribers or from public sources or auto matched based on two way match making preferences. Multidimensional Active Resources & Actions Provider(s) can delete one or more Multidimensional Active Resources & Actions and resources or modify selected Multidimensional Active Resources & Actions and communicate with selected active note(s) related one or more active note(s) provider(s).

By using menu "Active Resources & Actions Provider's Profiles Management" 651, user can manage or create or update one or more domain or field specific profile(s) to the central server. Central server stores, updates, indexes all public, private and shared profile(s) and make them searchable for all or selected users for searching, book marking, subscribing Multidimensional Active Resources & Actions Provider(s). Multidimensional Active Resources & Actions Provider(s) can manage accounts and apply settings for security and personalization and customization.

By using menu "Active Resources & Actions Management" 653, Multidimensional Active Resources & Actions Provider(s) can create new or edit or delete or draft one or more Active Resources & Actions and associate metadata including date & time, category, author, types of resources, rank, set status and like, attach or detach one or more resources including text, message(s), link(s), video(s), audio, voice, files, images, photos, application(s), service(s), structures resource(s) and resources from other sources like search from current networks i.e. central server search engine (Global & public past Multidimensional Active Resources & Actions) or from other external networks, search resources from local network (past Multidimensional Active Resources & Actions), shared or subscribed or updated (via synchronization) resources from subscribed or collaboration sources i.e. other Multidimensional Active Resources & Actions Provider(s) with one or more Active Resources & Actions related to selected one or more active note(s) or active sub note(s). Multidimensional Active Resources & Actions Provider(s) can sort (date, time, source and category wise) or search or order or organize or select view types of Active Resources & Actions. Multidimensional Active Resources & Actions Provider(s) can sent or schedule all or selected one or more Multidimensional Active Resources & Actions to related one or more selected active note(s) provider(s). Multidimensional Active Resources & Actions Provider(s) can also transfer or assigned selected one or more active note(s) to other subscribed or group(s) of Multidimensional Active Resources & Actions Provider(s) and received Multidimensional Active Resources & Actions and route to said elated active note(s) provider(s).

By using menu "Active Notes & Active Note Providers Management" 654 Multidimensional Active Resources & Actions Provider(s) can receive one or more active note(s) from one or more active note(s) provider(s) including from connected or selected or subscribed or from central server search engine i.e. search from public sources, via bookmarks or auto matched based on two way match making preferences, transferred or assigned from other Multidimensional Active Resources & Actions Provider(s) or sources. Multidimensional Active Resources & Actions Provider(s) can clarify before providing Multidimensional Active Resources & Actions and communicate with active note(s) provider(s). Multidimensional Active Resources & Actions Provider(s) can assign rank & give comments to active note and/or to active note(s) provider(s), set status for active note(s), report abuse, sort and view as per choice or selection.

By using menu "Search Management" 655 Multidimensional Active Resources & Actions Provider(s) can search various things from the central server search engine including search domain or subject or keyword(s) or search query specific one or more public active note(s) and bookmark them for providing Multidimensional Active Resources & Actions to active note(s) provider(s). Multidimensional Active Resources & Actions Provider(s) can also search relevant Multidimensional Active Resources & Actions for particular active note(s) and update or sent to said active note(s) provider(s). For understanding user or active note(s) providers and related one or more active note(s) and providing relevant or contextual Multidimensional Active Resources & Actions, Multidimensional Active Resources & Actions Provider(s) can search and view all public or shared or filtered life stream and resources of active note(s) provider(s). Multidimensional Active Resources & Actions Provider(s) can search and/or bookmark and/or subscribe other related Multidimensional Active Resources & Actions Provider(s) for collaboration.

By using menu "Collaboration Management" 656, Multidimensional Active Resources & Actions Provider(s) can collaborate with other Multidimensional Active Resources & Actions Provider(s) including known or connected or like minded public sources or find people for current or existing or internal or external sources or networks or social networks and inviting them or subscribe Multidimensional Active Resources & Actions Provider(s) or set two way match making preferences for auto matching Multidimensional Active Resources & Actions Provider(s) by central server.

By using menu "Applications & Services" 655, Multidimensional Active Resources & Actions Provider(s) can search and associate or attach or detach one or more related application(s) and/or service(s) for particular or one or more active note(s) and sent to active note(s) provider(s).

Registered user or active note(s) provider(s) and active resources & actions provider(s) or viewers (Non-Members), and other uses may employ a search interface; one embodiment of screen 700 is illustrated in FIG. 7 as an example.

Active note(s) provider(s) can search 702 or match as per preferences 703 one or more multidimensional active resources & actions 706 and active resources & actions providers 705 by entering one or more keyword(s), User name or ID, search query, phrases, Boolean operators or commands or conditions or rules to the search box 701. User can also filter or further limit what is displayed. Just use the filters available on the page to target results. Using the filters will limit results related to one or more selected categories, taxonomies 713, ontology, metadata, controlled vocabulary 714, connected users 715, active resources & actions providers 716. User can also select one or more sources of searches including search from global central server 709 and/or user's personal or social network(s) 710 and/or local network(s) 711 and/or selected one or more connected users and/or active resources & actions providers 712. Then user can select one or more active resources & actions providers for bookmarking 756 and/or subscribing the selected sources 752. User can search and select active note(s) specific one or more active resources & actions 706 and add to the active note(s) related list of multidimensional active resources & actions 751. User can also share 757, rank 758, sort 760, save 762 and filter 761 the said selected multidimensional active resources & actions and providers. Search results 730 display as per source clusters including central server, selected connected users, providers and local sources and tab interface facilities the user for switching from one tab to other tabs. Each search result of search results related to multidimensional active resource(s) & action(s) shows profile(s) link(s), name or user ID, categories, online status, rank, reviews or comments, hit statistics, levels & points and associate active note and related one or more multidimensional active resources & actions with metadata including date & time, resource type, one or more taxonomies, ontology, categories, attachments, web links, source, advertisements and like. Search results divided as per number of search results per page in to number of pages and user can navigate from one page to others 735. User can Sort 758 results 730 by recently updated, category wise, time & date wise, location wise and popularity wise including hits, visits, ranks. Searches can also allow wildcards. User or Providers can also employ advance search engine for providing one or more parameters or criteria like location(s), language(s), date & time range, one or more categories or selection for lists, rank and like 704.

User can click-through entry on search results list, resources from central server can then appear under "Central Server" tab, resources from selected connections can appear under "Connected Source" tab, resources from providers appear under "Providers Source" tab and resources from local pc or application or network can appear under "Local Sources" tab. Moreover, administrators, or the like, are able to search for users by username, or by email address (either of these can allow wildcard searches), or by some combination of Type (user, member, expert or admin) and Source, as defined by drop downs, or the like.

User can also search other users public life stream(s) sources & contents 708 and subscribe to one or more selected life stream(s) updates 755.

Multidimensional active resources & actions provider(s) can search 702 one or more active note(s) and/or active note(s) provider(s) 707 by entering one or more keyword(s), User name or ID, search query, phrases, Boolean operators or commands or conditions or rules to the search box 701. Provider's can also filter or further limit what is displayed. Just use the filters available on the page to target results. Using the filters will limit results related to one or more selected categories, taxonomies 713, ontology, metadata, controlled vocabulary 714. Provider's can select one or more active note(s) or subscribe to active note(s) provider's active note(s) updates for providing one or more multidimensional active resources & actions 753.

Multidimensional active resources & actions provider(s) can also search multidimensional active resources & actions provider(s) 705 for collaboration and search, select and add active note(s) specific multidimensional active resources & actions 706 and can search active note(s) provider's profile(s) 707 & public life stream 708 from the central for better understanding active note(s) and active note(s) provider(s). Provider can also share 757, rank 758, sort 760, save 762 and filter 761 the said selected multidimensional active resources & actions and providers and/or active notes and providers. Provider can sort 758 results 730 by recently updated, category wise, time & date wise, location wise and popularity wise including hits, visits, ranks.

Each search result of search results related to active note(s) shows profile(s) link(s), name or user ID, categories, online status, rank, reviews or comments, hit statistics, levels & points and associate active note and related one or more multidimensional active resources & actions with metadata including date & time, resource type, one or more taxonomies, ontology, categories, attachments, web links, source, advertisements and like. Search results divided as per number of search results per page in to number of pages and user can navigate from one page to others 735.

Figure 8:
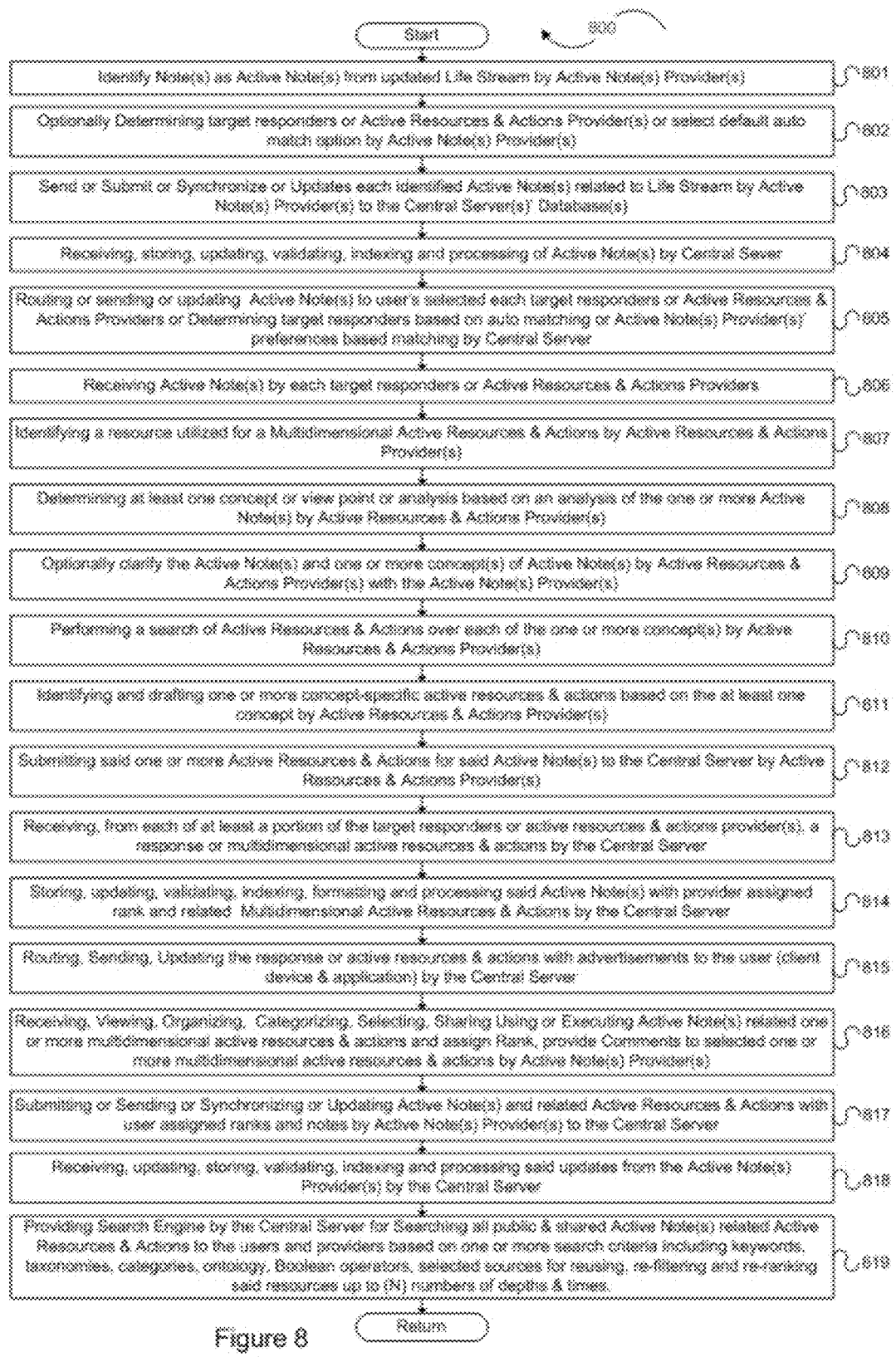
FIG. 8 is a detail logical flow diagram generally showing one embodiment of a process for providing active resources & actions by active resources & actions provider(s) to active note(s) provider(s) based on active note(s)

FIG. 8 is a logical flow diagram generally showing one embodiment of a process 800 for receiving and processing active notes from a client device, such as mobile device 135 of FIG. 1. Process 800 corresponds to FIG. 4, and illustrates at least some details that may be included in the actions of FIG. 4, or in other parts of the process 400. Process 800 may employ at least a portion of the system illustrated in FIG. 1. It may employ any of the system variations as discussed herein, or it may be performed with other systems. In one embodiment, all, or at least a portion of the actions of process 800 may be performed by active note processor component 352 of FIG. 3.

Process 800 begins, after a start block, at block 801, where active note(s) provider(s) can identify any one or more note(s) of life stream as Active Note(s) or create new one or more Active Note(s) for one or more multidimensional resources & actions.

Process flow may then proceed to block 802 where active note(s) provider(s) can optionally determining one or more selected or subscribed or matched target responders or Active Resources & Actions Provider(s) or select default auto match option for submitting or sending or updating one or more active note(s).

Process flow may then proceed to block 803 where active note(s) provider(s) send or submit or synchronize or update one or more said identified Active Note(s) to the one or more selected or subscribed or matched multidimensional active resources & actions providers via Central Server(s) for one or more multidimensional active resources & actions.

Process flow may then proceed to block 804 where an active note(s) is received, stored, updated, validate, indexed and processed by the central server from a client device, such as mobile device 135 of FIG. 1. In one embodiment, the action of block 804 is performed by a Multidimensional Active Resources & Actions server, such as server 110 of FIG. 1. In one embodiment, the transmission of the active note(s) from the client device to the Multidimensional Active Resources & Actions server may include the use of an instant messaging mechanism. SMS and other messaging mechanisms or communication mechanisms may be used in the transmission or reception of the active note(s). Receiving the active note(s) may include extracting identifying information associated with the client device, such as a phone number, email address, location, or a user's identity. In one embodiment, the central server may process the active note(s) including language, content, meaning, check spelling, translation, decide priority, current location of user, source application(s) or device(s) or service(s) or network(s) information, associate one or more relevant matched resources including one or more part of life stream, past active note(s) & related ranked resources, active note provider's profile(s) covering preferences, personal profile, rank, points, levels, domain specific updated profiles like travel, health, education, jobs, food, entertainment, hobby, interest, business and metadata including one or more categories, taxonomies, ontology, keyword(s) and like related to the active note(s).

Process may then flow to block 805, where a target responder set is determined from a responder community. As discussed above, a responder may specify information, such as content areas of expertise, geographic areas, languages spoken, desired frequency of active note(s), or the like. Any one or more of these specifications may be used to determine an appropriate target responder set. A time since being sent a most recent active note(s) may also be used to determine a target responder set. A responder's history may be used; for example, the number of points a responder has received may be a factor. Central server routing or sending or updating said Active Note(s) to user's selected one or more target responders or Active Resources & Actions Providers or Determining target responders based on auto matching or Active Note(s) Provider(s)' preferences based matching.

In one embodiment, determining a target responder set may include selecting responders based on their geographic location or geographic locations in which each responder has expertise. A geographic area may be determined based on an Active Note(s) Provider's Active Note. An Active Note may explicitly state a geographic area, such as in an Active Note(s), "I am traveling in USA and now in New York City". An Active Note(s) may suggest that the multidimensional active resources & actions is to be limited to a geographic area, and the area may be determined based on information received from a client device or from other knowledge of the Active Note Provider(s). For example, a client device may transmit a location based on a GPS or other location determination mechanism. In another example, a prior communication from an Active Note(s) Provider(s) may indicate the user's location. In one embodiment, an active note(s) is analyzed to determine whether a response is to be limited to a geographic area. An analysis may, for example, determine that active note(s) pertaining to certain types of businesses, products, or services are to be limited to a geographic area, while other businesses, products or services are not so limited. For example, an analysis of a an active note(s) about a hair oil may indicate a limited geographic area, while a active note(s) about foreign tour or a luxury brands may indicate a nationwide or worldwide geographic area.

Processing may then flow to block 806, where the processed & validated Active Note(s), which may include any supplementary information, is sent to each of the responders or multidimensional active resources & actions providers in the target responder or multidimensional active resources & actions providers set. Thus, each target responders or Active Resources & Actions Providers can receive one or more prepared active note(s) from the central server. A determined timeout period may be sent with the active note(s). In one embodiment, this is transmitted using an IM mechanism. In some embodiments, SMS or other communication mechanisms or protocols may be employed. A multidimensional active resources & actions server may use a first communication mechanism for a portion of the target responder or multidimensional active resources & actions providers set and a second communication mechanism for a second portion of the target responder or multidimensional active resources & actions providers set.

Processing may then flow to block 807, where one or more targeted Active Resources & Actions Provider(s) can identifying a resource utilized for a Multidimensional Active Resources & Actions for said received one or more active note(s) from one or more active note(s) provider(s) from the central server including searching or subscribing said active note(s) provider's related resources and public & shared life stream, one or more active note(s) domain or category or subject(s) related profile(s) and like.

Processing may then flow to block 808, where Active Resources & Actions Provider(s) can determine at least one concept based on an analysis of the one or more Active Note(s). At a decision operation, the active resources & actions providers determines whether any known concepts are identified from the submitted active note(s). The active resources & actions providers may perform a lookup operation for concepts associated with the active note(s), or may perform other interpretations, such as natural language processing, to determine concepts. Concepts generally identify categories of information related to the active note(s). For example, the active note(s) "New York City" is related to the concept of a city and the concept of a play. As another example, the search term "New York Shopping Mall" is related to the concept of a luxury branded products availability and the concept of shopping in the city of New York.

Domain or subject specific experts or experienced or qualified or known multidimensional active resources & actions providers can use active note(s) provider(s) all resources including matched domain specific profile(s), past active note(s) & related active resources & actions and ask more details or ask question(s) or clarify the active note(s) or communicate with active notes) provider(s) using any communication application(s), service(s), device(s) and networks like instant messenger (IM), mobile phone, e-mail, VOIP, online web sites and search active note(s) specific other similar users active notes & related active resources and action(s) and analyze the said active note(s) from multiple view points or angles before determining the one or more relevant or contextual concept(s) or multidimensional view points.

Each concept may also associate with one or more particular data sources. For instance, play or movie schedules for local theaters may be in specific data sources that would not normally be searched unless it is determined that the user intends the search term to be associated with a play or movie. Other examples of concept-specific data sources may include, but are not limited to:

E.g. web stock quote data, photos, image, dictionary, plane schedules, podcasts, video, entertainment, local listings, encyclopedia, products, news, events, ringtones, weather, cruise, schedules, guides, multimedia, finance, address, books, flight status, shopping, astrology, games, sports, audio, music, cinema ticket booking, cricket match ticket bookings, products inventory, thesaurus, books, job, bus schedules, landmarks, time zones, celebrities, lottery, train schedules, cities, movie show times, translations, classifieds, movie theaters, traffic, TV show times, countries, currency, people, events or venues, and like.

Processing may then flow to block 809, where Active Resources & Actions Provider(s) can clarify the Active Note(s) and one or more identified concept(s) related to Active Note(s) with the Active Note(s) Provider(s) for better understanding user's active note(s), activities, requirements, interest, behavior, and like.

Processing may then flow to block 810, where Active Resources & Actions Provider(s) can performing a search of Active Resources & Actions over each of the one or more concept(s) from plurality of sources including central server search engine, online web sites, local hard drive, deep databases, paid data sources, services, collaboration of searching, human mind, peer to peer search, a bookshelf and a non-public sources and like.

Processing may then flow to block 811, where Active Resources & Actions Provider(s) can identifying and drafting relevant one or more concept-specific active resources & actions based on the at least one concept for active note(s). For drafting contextual Active Resources & Actions, Active Resources & Actions Providers can employ his/her experience, analysis, human mind, knowledge, information, database(s), multiple resources, sources, people including collaborations with other Active Resources & Actions, connections, experts, paid services, one or more applications, services, online web sites and like. Active Resources & Actions Provider(s) can be any types of individual or group of individuals (multi users) or paid or free or sponsored experts like individual or person or groups or any company or branded company or organization or volunteers or government departments or automated source(s) or service(s) or database(s) or device(s) or one or more or multiple artificial agents and like. Active Resources & Actions Provider(s) can integrate or embedded or associate one or more relevant advertising(s) of any formats including text, video, images(s), multimedia, audio, advertising(s) automatically and/or selecting manually (human mediated) and additional information and metadata.

Processing may then flow to block 812, where Active Resources & Actions Provider(s) can submitting or sending or synchronizing or updating said one or more Active Resources & Actions for said Active Note(s) to the Central Server. Active Resources & Actions Provider(s) can employ one or more communication and collaboration applications, services, devices, technologies and networks including online or mobile web site or portal, peer to peer application, smart client desktop or mobile application, mobile or smart devices, SMS, IM, email, chat, customize application, sensors, data transfer protocols, voice enabled or translating technologies, enterprise application, web services, APIs, scripting, programming languages for sending or submitting or updating said active note(s) related Active Resources & Actions to the central server or directly to the user or active note(s) provider(s).

Processing may then flow to block 813, where the central server receiving from each of at least a portion of the target responders or active resources & actions provider(s), a response or multidimensional active resources & actions and processing responses from responder devices, such as responder client devices 150-152 of FIG. 1. Process of block 813 corresponds to blocks 456 & 457 of FIG. 4, and illustrates at least some details that may be included in the actions of blocks 456 & 457, or in other parts of the process 400. Process of block 813 may employ at least a portion of the system illustrated in FIG. 1. It may employ any of the system variations as discussed herein, or it may be performed with other systems. In one embodiment, all, or at least a portion of the actions of process of block 813 may be performed by Response or Active Resources & Action(s) Processor component 354 of FIG. 3.

In one embodiment, the action of block 813 is performed by a multidimensional active resources & actions server or Connected Life Central Server or central server, such as server 110 & database 111 of FIG. 1. In one embodiment, the transmission of the response from the responder client device to the central server may include the use of an instant messaging mechanism. SMS and other messaging mechanisms or communication mechanisms may be used in the transmission or reception of the responses.

Receiving a response may include receiving information identifying the corresponding active note(s) that was previously sent to the responder. It may include retrieving information identifying the responder. As discussed above, it is envisioned that the invention may be practiced in an environment that include a large community of responder clients. It is further envisioned that the set of target responders, and the number of responses received, may number in the hundreds, thousands, hundreds of thousands, millions, or virtually any number.

A received response may include information in one or more of a variety of types or formats. A response may include a text response, a message, an image, a link, video, audio, photo, image, voice, sound, any types of files, databases, any types of formats, another type of data, application, service, or a combination thereof.

Processing may then flow to block 814, where the Central Server stores or updates and validates or processes and indexes said active note(s) and related Multidimensional Active Resources & Actions with ranks and metadata for routing to active note(s) provider(s) and make said resources searchable for other similar users or searchers. Central server can validates the said each resources including spam scanning, virus scanning, language interpretation, source scanning, optionally human mediated checking, spell checking, translation and formatting said resources including formatting as per preferences or destination one or more applications or services or devices or networks types for end user or active note(s) provider(s). Central server can also associate one or more relevant or contextual advertisements automatically and/or manually (human mediated) of any formats including text, video, images(s), multimedia, audio, advertising(s) integration or embedding with resources and additional information, metadata, system data with said active note(s) specific resources before sending to active note(s) provider(s) or user.

Processing may then flow to block 815, where the central server can routing or sending or updating the response or active resources & actions with advertisements to the user on client device & application.

Processing may then flow to block 816, where the Active Note(s) Provider(s) can receiving active note(s) related multidimensional active resources & actions, and perform any types of post operations like viewing, organizing, formatting, categorizing, sorting, comparing, printing, merging, selecting, using, following, executing and assign rank, associate metadata, give comments to selected or used or liked or executed one or more multidimensional active resources & actions.

Processing may then flow to block 817, where the Active Note(s) Provider(s) can submitting or sending or synchronizing or updating active note(s) and related Active Resources & Actions with assigned ranks and comments to the Central Server.

Processing may then flow to block 818, where the central server can receiving, updating, storing, formatting, categorizing, organizing, validating, indexing and processing said active note(s) and related multidimensional active resources & actions updates from the Active Note(s) Provider(s).

Processing may then flow to block 819, where the central server providing a search engine for searching all public & shared Active Note(s) related Active Resources & Actions to the users or all searchers and multidimensional active resources & actions providers based on one or more search criteria including keywords, taxonomies, categories, ontology, Boolean operators, selected sources for reusing, re-filtering and re-ranking said resources up to (N) numbers of depths & times.

Process 800 may then return to a calling program. In one embodiment, processing may continue at block 801, described in FIG. 8 or continue at block 416, described in FIG. 4.

Figure 9:
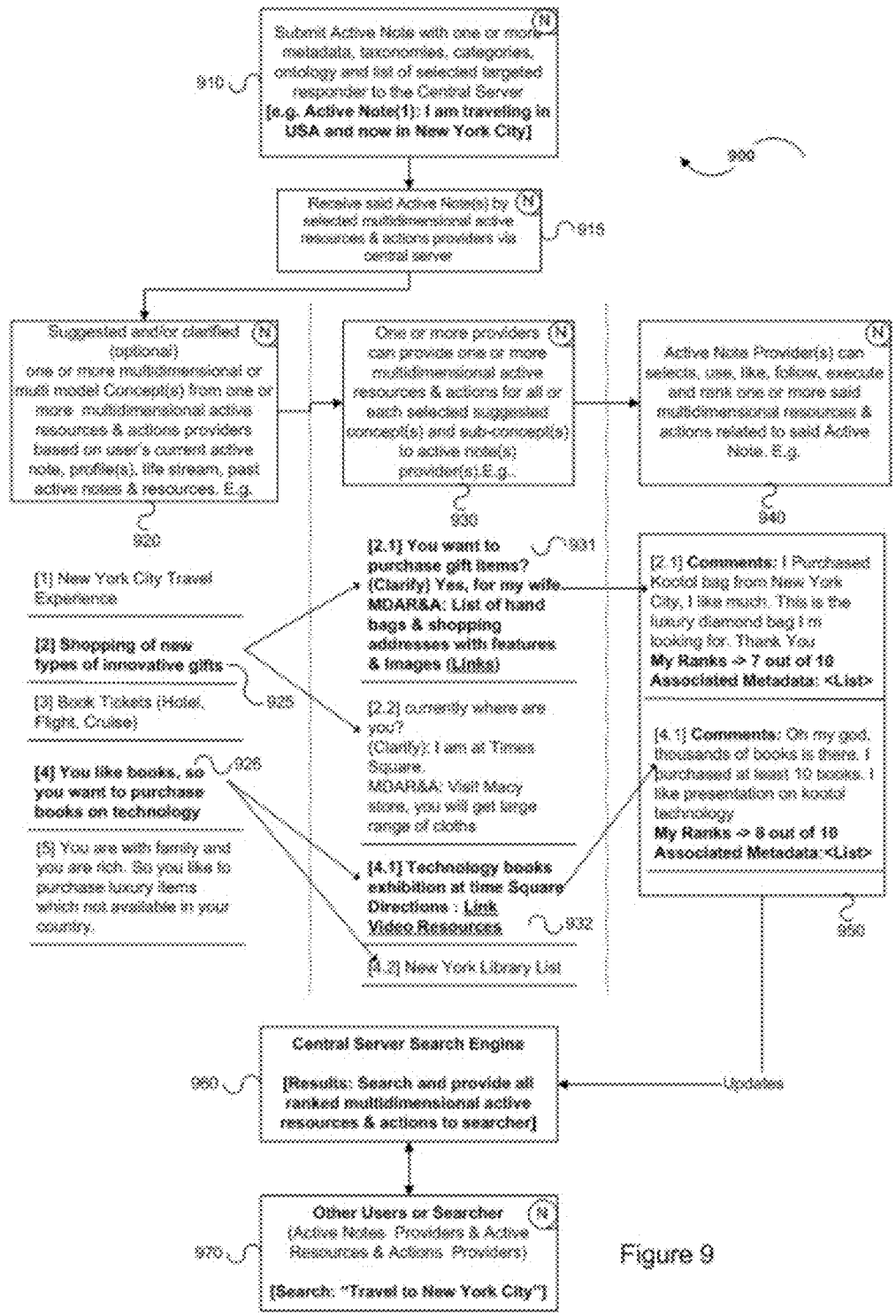
FIG. 9 is a logical flow diagram of example generally showing one embodiment of a process for providing active resources & actions by active resources & actions provider(s) to active note(s) provider(s) based on active note(s)

It will be understood that each block of the flowchart illustrations of FIGS. 4, 8 and 9, and combinations of blocks in the flowchart illustrations can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

FIG. 9 is a logical flow diagram of step by step example generally showing one embodiment of a process 900 for receiving and processing active notes from a client device, such as mobile device 135 of FIG. 1. Process 900 corresponds to FIG. 4 and FIG. 8, and illustrates at least some details that may be included in the actions of FIG. 4 and FIG. 8, or in other parts of the process 400 and 800. Process 900 may employ at least a portion of the system illustrated in FIG. 1. It may employ any of the system variations as discussed herein, or it may be performed with other systems. In one embodiment, all, or at least a portion of the actions of process 800 may be performed by active note processor component 352 and Response or Active Resources & Action(s) Processor 354 of FIG. 3.

Process 900 begins, after a start block, at block 910, where active note(s) provider(s) can submit Active Note: e.g. "I am traveling in USA and now in New York City" with one or more metadata, taxonomies, categories, ontology and list of selected targeted responder to the central server. Central server route said active note(s) to 915 user selected targeted responder or multidimensional active resources & actions providers. Multidimensional active resources & actions providers receive said active note(s) of said active note(s) provider(s) from central server and determining and identifying one or more suggested concept(s) 920 based on user's current active note, profile(s), life stream, past active notes & resources and optionally verified or clarified with active note(s) provider(s) by communicating with said active note(s) provider(s). e.g. multidimensional or multi mode concept(s) for said active note(s) includes [1] New York City Travel Experience, [2] Shopping of new types of innovative gifts, [3] Book Tickets (Hotel, Flight, Cruise), [4] You like books, so you want to purchase books on technology and [5] You are with family and you are rich. So you like to purchase luxury items which not available in your country.

Then, said one or more providers can provides one or more multidimensional active resources & actions for all or each selected suggested concept(s) and sub-concept(s) to active note(s) provider(s) e.g. based on concept 925 [2] Shopping of new types of innovative gifts, provider provides related multidimensional active resources & actions including e.g. [2.1] You want to purchase gift items?; (Clarify) Yes, for my wife.; MDAR&A: List of hand bags & shopping addresses with features & Images (Links), [2.2] currently where are you?; (Clarify): I am at Times Square.; MDAR&A: Visit Macy store, you will get large range of cloths and based on concept 925 [4] You like books, so you want to purchase books on technology, provider provides related multidimensional active resources & actions including e.g. [4.1] Technology books exhibition at time Square; Directions: Link; Video Resources, and [4.2] New York Library List.

Then Active Note Provider(s) can selects, use, like, follow, execute and rank 940 one or more said multidimensional resources & actions related to said Active Note e.g. user select & use or implement concept 925 [2] Shopping of new types of innovative gifts, based multidimensional active resources & actions 931 [2.1] You want to purchase gift items?; (Clarify) Yes, for my wife.; MDAR&A: List of hand bags & shopping addresses with features & Images (Links) and concept 926 [4] You like books, so you want to purchase books on technology, based multidimensional active resources & actions 932 [4.1] Technology books exhibition at time Square; Directions: Link; Video Resources and provides comments and assign ranks to each selected or used or liked or implemented or executed said multidimensional active resources & actions e.g. 950 [2.1] Comments: I Purchased Kootol bag from New York City, I like much. This is the luxury diamond bag I m looking for. Thank You; My Ranks->7 out of 10; Associated Metadata: <List>, and [4.1] Comments: Oh my god, thousands of books is there. I purchased at least 10 books. I like presentation on kootol technology; My Ranks->8 out of 10; Associated Metadata: <List> and submit said resources with rank and comments to the 960 central server for making them searchable for 970 other users, multidimensional active resources & actions providers and searchers. e.g. 970 if searcher search "Travel to New York City" to the central server 460 then search results contains all ranked multidimensional active resources & actions related to said search query or keyword(s).

The above specification, examples, and data provide a complete description of the manufacture and use of the composition of the invention. Since many embodiments of the invention can be made without departing from the spirit and scope of the invention, the invention resides in the claims hereinafter appended

I claim:

1. A method of processing active note(s) and associated active resources & actions related to life stream using a network device in communication with a client device comprising: identifying the note as active note(s) by active note(s) provider(s); determining a set of at least one target responders or active resources & actions provider(s) by active note(s) provider(s); send or submit the said active note(s) by active note(s) provider(s) to the central server; receiving, from the client device, the active note(s) of active note(s) provider(s) by the central server; determining a set of at least one target responders or active resources & actions provider(s) by the central server; sending or presenting, to each target responder or active resources & actions provider(s), a representation of the active note(s); receiving by each target responder or active resources & actions provider(s), a representation of the active note(s) to providing a multidimensional active resources & actions for the active note(s); identifying a resource utilized for a multidimensional active resources & actions and produce multidimensional active resources & actions; determining at least one concept based on an analysis of the one or more active note(s); optionally clarify the active note(s) and related one or more concept(s) by active resources & actions provider(s) with the active note(s) provider(s); optionally performing a search of active resources & actions over each of the one or more concept based at least on the active note(s) to generate a plurality of multidimensional active resources & actions; identifying and drafting one or more concept-specific active resources & actions based on the at least one concept; submitting said one or more multidimensional active resources & actions for said active note(s) to the central server; receiving, storing, updating, validating, formatting, processing and indexing from each of at least a portion of the target responders or active resources & actions provider(s), a response or multidimensional active resources & actions; sending the response or active resources & actions with advertisements to the client device; receiving, viewing, organizing, categorizing, sharing, selecting and using active note(s) related one or more multidimensional active resources & actions and assign rank and provide comments to selected or used said one or more multidimensional active resources & actions by active note(s) provider(s); updating said one or more multidimensional active resources & actions related rank and comments to the central server; and providing search engine for searching said active note(s) specific ranked multidimensional active resources & actions based on one or more search criteria to the searchers by the central server.

2. The method of claim 1, wherein allowing user or active note(s) provider(s) to creating and updating connections list(s) based on contacts, invitation, finding people from internal or external networks, searching & matching, subscribing, book marking and match making preferences.

3. The method of claim 1, wherein said receiving, selecting, presenting and supplying may be performed in real or near real time.

4. The method of claim 1, wherein allowing active note(s) provider(s) or active resources & actions provider(s) to submit one or more public, private or shared domain or subject or purpose or categories or service specific profile(s) with metadata from the client device to the central server for storing, indexing and updating of said submitted profile(s) for matchmaking of active note(s) and/or active note(s) provider(s) with the active resources & actions providers and/or active resources & actions by the central server.

5. The method of claim 1, wherein allowing user or active note(s) provider(s) to updating life stream timeline related note(s) & resources including text, messages, emails, communication related messages & resources, web links, connections, videos, images, photos, albums, graphics, multi medias, audio, voice, any types of files, documents, databases, applications & services, updated resources from connected people or internal or external sources & services, any types of free form or scanned or structured resources, user's or connected users' generated contents like publications, blogs, news, events, updates, notes, experiences, reviews, discussion, likes & dislikes, activities, solutions, sharing, purchases, brands use and want to use, history and everything related to user's and connected users' life which are useful to user's and other like minded or similar users for similar activities.

6. The method of claim 5, wherein allowing user or active note(s) provider(s) to associate one or more taxonomies, ontology, categories, semantic syntax, meaning, controlled vocabulary, keyword(s), comments, notes and metadata to one or more life stream.

7. The method of claim 6, wherein associating one or more taxonomies to said life stream for organizing life stream comprising allowing user or active note(s) provider(s) to download or synchronize or update one or more default top level or parent system taxonomies from the central server and allow user to append or update one or more user created taxonomies of one or more levels to said default top levels or main system taxonomies.

8. The method of claim 5, wherein allowing user or active note(s) provider(s) to sharing or synchronizing one or more categories or taxonomies specific life stream or selected one or more active note(s) and related multidimensional active resources & actions with one or more selected or matched users or contacts or connections or subscribers.

9. The method of claim 5, wherein allowing user or active note(s) provider(s) to subscribing one or more categories or taxonomies or list(s) specific public or shared life stream(s) of other users or active notes providers based on one or more search criteria and connections with permission.

10. The method of claim 5, wherein allowing user or active note(s) provider(s) to allow other users to subscribe user's one or more categories or taxonomies or list(s) specific public or shared life stream(s) with permission.

11. The method of claim 5, wherein allowing user or active note(s) provider(s) to subscribe other users' one or more categories list(s) of public or shared life stream(s) and/or create one or more categories list(s) of other users' public or shared life stream(s) and make the list(s) as public, private or shared and allow other users to subscribe said one or more list(s).

12. The method of claim 1, wherein identifying the note as active note(s) by active note(s) provider(s) comprising allowing user or active note(s) provider(s) to make any note(s) of life stream(s) as active or create new active note(s) and determining target responders or active resources & actions provider(s) or select default auto match option for submitting or sending or updating or synchronizing said one or more active note(s) to one or more selected or subscribed or bookmarked or matched multidimensional active resources & actions provider(s) for multidimensional active resources & actions by active note(s) provider(s) via central server.

13. The method of claim 1, wherein the said active note(s) comprising one or more statement(s), details, story, blog, details, descriptions, message(s), text, image(s), video(s), query, keyword(s), phrase(s), Boolean operators, rules, condition(s), meanings, semantic syntax, ontology with metadata including categories, taxonomies, keyword(s), source id, source profile(s), date & time, location and like.

14. The method of claim 1, wherein determining the set of at least one target responders or active resources & actions provider(s) by active notes provider(s) for submitting or sending or publishing or updating one or more active note(s) to one or more active resources & actions provider(s) comprises allowing user or active notes provider(s) to selectively including one or more responder(s) or active resources & actions provider(s) in the set based on contacts, connections, group(s) or list(s), subscriptions, bookmarks, searching & selection, two way auto match making preferences, publishing in public or one or more filtered cluster(s) or domain(s) or categories or keyword(s) or like.

15. The method of claim 1, wherein the said active note(s) may related to any types of activities, purpose, updated status, reason, thought, motive, logic, act, intention, point, idea, what are doing currently, want to do something, did something, aim, goal, ambition, desire, want, wish, need, activity, requirement, request, query, question, appeal, end, object, matter, plan, target, task, issue, subject, topic, project, case, event, problem, attempt, try, what next thing user do, what happen next, likes & dislikes, hobby, selection or choice, around anything related to user's or entity's environment like brands & services using, brands & services want to use, before spent money, before or currently doing something, likes or dislike, every types of experiences, reviews, interest, relation, connected people, all types of works, activities, actions, jobs, procedures, to do, about user, user's life, health, education, travel, entertainment, life style, finance, job, business, career, learning, training, food, habit, hobby and like.

16. The method of claim 1, wherein the said active notes provider(s) and multidimensional active resources & actions provider(s) may including one or more persons or individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises, virtually any person, group of persons, businesses, organizations, service providers, data providers, application developer or even a computing structure including a program, data & service source, or an entity that exists as a particular and discrete unit and like.

17. The method of claim 1, wherein the central server can receiving, storing, updating, validating, formatting, indexing and processing said each active note(s) from said one or more active note(s) providers.

18. The method of claim 1, wherein determining the set of at least one target responders or active resources & actions provider(s) by the central server for routing or submitting or sending or publishing or updating one or more active note(s) of one or more active note(s) provider(s) to one or more active resources & actions provider(s) comprises searching a database for a multidimensional active resources & actions providers matching the active note(s) based on associated metadata, rank, two way auto match making preferences of active note(s) provider(s) including one or more taxonomies, categories, keywords, ontology, meaning, semantic syntax, metadata, controlled vocabulary, thesaurus, phrases, Boolean operators, rules, conditions and active note(s) provider(s)' one or more selections or subscriptions or connections of active resources & actions providers.

19. The method of claim 1, wherein allowing active resources & actions provider(s) to collaborating with one or more other active resources & actions provider(s) based on contacts, connections, invitation, searching & matching, subscribing, book marking and two way auto match making preferences and find public active resources & actions provider(s) from central server or internal or external social or other networks & services.

20. The method of claim 1, wherein allowing each target responders or active resources & actions provider(s) to receive all active note(s) with metadata & system data automatically from all pre defined or subscribed or connected active note(s) providers via central server or receive one or more active note(s) with metadata & system data from one or more selected or connected or subscribed or two way auto match making preference based active note(s) provider(s) or search, book mark, select and receive active note(s) or received active note(s) assigned from other active resources & actions provider(s) for collaboration from the central server and presenting said received one or more active note(s) as per multidimensional active resources & actions provider's choice and categories as per sources including all or public or expert or subscribers or connected or group(s) or list(s) or assigned sources.

21. The method of claim 1, wherein said identifying a resource utilized for a multidimensional active resources & actions comprising identifying a resource utilized for a multidimensional active resources & actions in association with a keyword(s) contained in the active note(s); and distributing, providing, sharing, synchronizing, updating, displaying the resource to said active resources & actions providers registered to accept active note(s) related to the one or more keywords) or profile(s) or taxonomies or ontology or categories like field, subject, topic, domain, expertise, interest, services and like.

22. The method of claim 1, wherein said determining at least one concept based on an analysis of the one or more active note(s) by multidimensional active resources & actions providers comprising determining the one or more concept(s) based on analysis of the active note(s), active note(s) provider's one or more categories or part(s) of life stream, past active note(s) & related ranked used multidimensional active resources & actions, active note provider's one or more profile(s) covering preferences, personal profile, rank, points, levels, domain specific updated profiles, purchase or e-commerce history, current location of user, connected users information and like.

23. The method of claim 1, wherein said one or more multidimensional active resources & actions providers can clarify the said active note(s) and related one or more concept(s) with the said related active note(s) provider(s).

24. The method of claim 1, wherein allowing active note(s) provider(s) or active resources & actions provider(s) to search active note(s) and/or concept specific one or more active resources & actions based on one or more concepts, search criteria, keyword(s), categories, meanings, taxonomies, ontology, semantic syntax, conditions, rules, Boolean operators, phrases, search query and messages from local and/or online central server and/or external sources & services integrated by API and/or connected social or personal networks or from any selected connections.

25. The method of claim 1, wherein allowing active resources & actions provider(s) to search active note(s) specific one or more active resources & actions or active note(s) provider(s) specific public or shared or filtered life stream based on one or more search criteria, keyword(s), categories, meanings, taxonomies, ontology, semantic syntax, conditions, rules, Boolean operators, phrases, search query and messages.

26. The method of claim 1, wherein said one or more multidimensional active resources & actions provider(s) can identifying and drafting one or more concept-specific active resources & actions based on the at least one concept based on active resources & actions provider's experience, analysis, human mind, other sources and database(s) of knowledge, information, resources from connected users and other active resources & actions providers, connections, experts, paid services, one or more applications, services, online web sites, books and multidimensional active resources & actions source comprises one of a user computer system, a digital multidimensional active resources & actions source, a multidimensional active resources & actions provider(s), application, service, a telephone or mobile, a smart device, an automated multidimensional active resources & actions source, a sensor systems, a human mind, a image, a video, a file, a translation system and a speech or voice multidimensional active resources & actions source.

27. The method of claim 1, wherein allowing one or more active resources & actions provider(s) to sent or update or synchronize one or more active resource(s) & action(s) related to one or more active note(s) of one or more active note(s) provider(s) to the client device via central server.

28. The method of claim 1, wherein the said multidimensional active resources & actions may comprising any types of resources including text, messages, emails, communication messages & resources, web links, connections, videos, images, photos, albums, graphics, multi medias, audio, voice, any types of files, documents, databases, applications, services, updated resources from internal or external sources, any types of free form or scanned or structured resources by active resources & actions provider(s) or connected or subscribed active resources & actions provider(s) including articles, publications, blogs, news, events, experiences, reviews, discussion, actions, sharing, suggested brands, providing multiple concept(s) specific suggested resources & action(s) including one or more actions, what to do, better way to do, more ways, questions & related answers, answers, suggestions, solutions, guidance, helps, finance, supplies, information, knowledge, tips & tricks, training, learning, match making, ideas, what, where, when, why and how like information, one or more actions, suggestions, solution, direction, guidance, execution plan, step by step procedures, to do, tips & tricks, more particularly, but not exclusively to using a community to provides personalized or customized multi model or multidimensional active resources & actions for active note(s), result-oriented actions, positive steps, active resources designed to actively promote and advance the user's status, any measures taken to rectify conditions, acts or deeds used to remedy a situation, solution for removing an error, or adjust a condition, how to carry out a task, how to execute the things, planned series of actions, tasks or steps designed to achieve an objective or goal, guide the implementation or improvements of any types of process including task assignments, milestones, timelines, resource allocations, data collection methodology, and evaluation, step or series of steps to be taken, detailed description of the steps used to implement a strategic plan, a plan to determine what information is missing or pending, where and when to collect this information, and who will need the information and anything related to active note(s) which are useful to active note(s) provider(s) and like.

29. The method of claim 1, wherein allowing multidimensional active resources & actions provider(s) to associate one or more application(s) and/or service(s) and metadata including date & time, resources type, resource structured tag type, source, one or more categories, taxonomies, controlled vocabulary, keyword(s), ontology with said active resource(s) & action(s).

30. The method of claim 1, wherein central server can receiving, storing, updating, validating, formatting, processing and indexing from each of at least a portion of the target responders or active resources & actions provider(s), a response or multidimensional active resources & actions for sending said active resources & actions related to said active note(s) to said active note(s) provider's client device.

31. The method of claim 1, wherein allowing user or active note(s) provider(s) to submit and updates one or more public, private or shared active note(s) and related active resources & actions with rank, comments, details and metadata from the client device to the central server for storing, indexing and updating said active note(s) and related active resources & actions.

32. The method of claim 1, wherein the central server can routing or synchronizing or sending or updating the said active note(s) specific response or active resources & actions with matched advertisements to the said user or active note(s) provider(s) on the client device.

33. The method of claim 1, wherein allowing user or active note(s) provider(s) to receive manually or automatically all or one or more selected multidimensional active resources & actions with metadata & system data from all or one or more selected active resources & actions providers related to one or more selected active note(s) from the central server and presenting said received multidimensional active resources & actions according to user's choice and categories as per sources type of said multidimensional active resources & actions including all or public or expert or subscribed or connected sources.

34. The method of claim 1, wherein allowing user or active note(s) provider(s) to set status, assign ranks or weight including positive or negative ranks and provide details of use or experience or comments on one or more multidimensional active resources & actions and submit said updates to the central server for updating, storing, validating, processing and indexing said updates and making them searchable for other users or searchers.

35. The method of claim 1, wherein allowing active resources & actions provider(s) to assign ranks or weight including positive or negative ranks and provide comments to selected one or more active note(s) from one or more active note(s) provider(s).

36. The method of claim 1, wherein at least one of receiving the active note(s), sending the representation of the active note(s), receiving the response or active resource(s) & action(s), or sending the response or active resource(s) & action(s) is performed using an instant messaging mechanism.

37. The method of claim 1, wherein allowing multidimensional active resources & actions provider(s) to set status, assign ranks and provide details or comments to one or more active note(s) and submit, update, store, validate, process and indexes said ranked active note(s) with multidimensional active resources & actions to the central server for making them searchable for searchers.

38. The method of claim 1, wherein each of receiving the active note(s), sending the representation of the active note(s), receiving the response or active resource(s) & action(s), and sending the response or active resource(s) & action(s) is performed using a communication mechanism to facilitate the client device sending the active note(s) and receiving the response or active resource(s) & action(s) within an instant messaging session.

39. The method of claim 1, wherein sending the representation of the active note(s) and receiving the response or active resource(s) & action(s) is performed within an instant messaging session.

40. The method of claim 1, wherein the active note(s) source comprises one of a user computer system, a digital active note(s) source, a user or active note(s) provider(s) application, a telephone or mobile, a smart device, an automated active note(s) source, a sensor systems, a human mind, any types of languages, a image, a video, a file, a translation system and a speech or voice active note(s) source.

41. The method of claim 1, wherein either the active note(s) provider or the active resources & actions provider(s) can modify the active note(s) during the request and response process.

42. The method of claim 1, further comprising transcribing a speech active note(s) into a text active note(s).

43. The method of claim 42, further comprising providing a voice message as multidimensional active resources & actions.

44. The method of claim 1, wherein the active note(s) source comprises a cellular telephone or a mobile device and the active note(s) comprises a text message.

45. The method of claim 44, wherein the multidimensional active resources & actions comprises a text message, images, videos displayed by the cellular telephone.

46. The method of claim 1, further comprising presenting an advertisement to a user or active note(s) provider(s) during the receiving, selecting, presenting and supplying.

47. The method of claim 1, wherein allowing an active resources & actions provider(s) accepting an active note(s) to designate the advertisement.

48. The method of claim 1, wherein advertisers may bid for position and placement and timing of advertisements associated with keywords on a user's or active note(s) provider's GUI.

49. The method of claim 1, wherein advertisers may bid for position and placement and timing of ads associated with keywords on the active resources & actions provider's GUI and the active resources & actions providers can optionally pick which advertisement is presented.

50. The method of claim 1, wherein determining whether the active note(s) has been previously responded; and providing previous responses responsive to the determining.

51. A system for processing a active note(s) of active note(s) provider(s) from a client device comprising: at least one network device containing program logic to perform the method of claim 1; and a plurality of responder(s) or active resource(s) & action(s) provider(s) devices in communication with the at least one network device, containing program logic to perform actions including: receiving and displaying a active note(s); and sending an active resource(s) & action(s) in an instant message.

* * * * *